(12) United States Patent
Tamaoki et al.

(10) Patent No.: US 7,760,423 B2
(45) Date of Patent: Jul. 20, 2010

(54) OPTICAL AMPLIFIER

(75) Inventors: Shinobu Tamaoki, Yokohama (JP);
Toshihiko Kishimoto, Yokohama (JP);
Haruo Nakaji, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/489,725

(22) Filed: Jul. 20, 2006

(65) Prior Publication Data

US 2007/0019285 A1 Jan. 25, 2007

(30) Foreign Application Priority Data

Jul. 20, 2005 (JP) .......................... P2005-210258

(51) Int. Cl.
*H04B 10/17* (2006.01)
*H04B 10/12* (2006.01)
(52) U.S. Cl. ................................ 359/341.41; 359/341.3
(58) Field of Classification Search ............. 359/341.41, 359/341.3
See application file for complete search history.

(56) References Cited

U.S. PATENT DOCUMENTS

| 5,058,976 | A  | * | 10/1991 | DiGiovanni et al. | .......... 385/24 |
| 6,542,677 | B2 | * | 4/2003  | Okuno             | .......... 385/123 |
| 6,600,595 | B2 | * | 7/2003  | Aida et al.       | .......... 359/341.3 |
| 6,631,026 | B2 | * | 10/2003 | Kinoshita et al.  | ...... 359/341.33 |
| 6,903,866 | B2 | * | 6/2005  | Aiso              | .......... 359/341.1 |
| 6,975,449 | B1 | * | 12/2005 | Mok et al.        | .......... 359/341.41 |
| 6,995,900 | B2 | * | 2/2006  | Keaton et al.     | ............ 359/341.1 |
| 7,061,669 | B2 | * | 6/2006  | Nakashima et al.  | .... 359/341.41 |
| 2002/0101652 | A1 | * | 8/2002 | Hayashi et al. | .......... 359/341.4 |
| 2004/0051938 | A1 | * | 3/2004 | Chan et al. | ................ 359/337.1 |

FOREIGN PATENT DOCUMENTS

| JP | 4-298724    | A | 10/1992 |
| JP | 10-12952    | A | 1/1998  |
| JP | 10-270785   | A | 10/1998 |
| JP | 10-303490   | A | 11/1998 |
| JP | 2001-127365 | A | 5/2001  |
| JP | 2001-168427 | A | 6/2001  |

OTHER PUBLICATIONS

Gloge, "Weakly Guiding Fibers", Applied Optics, vol. 10, No. 10, pp. 2254-2258 (Oct. 1971).*

* cited by examiner

*Primary Examiner*—Eric Bolda
(74) *Attorney, Agent, or Firm*—McDermott Will & Emery LLP

(57) ABSTRACT

The present invention relates to an optical amplifier with a structure for more effectively suppressing the over/under-shoot in transient responses in high-speed AGC. This optical amplifier is an optical device for amplifying signal light inputted therein, and comprises a rare-earth-element-doped optical fiber, an optical coupler, a light-receiving section, a pumping light source, and a control section. In particular, as a typical structure of the optical amplifier, the rare-earth-element-doped optical fiber has a cutoff wavelength λc set longer than the pumping light wavelength λp but shorter than the signal light wavelength λs, and mainly allows a pumping light component in a fundamental mode to propagate therethrough. The pumping light and signal light are made incident on the first rare-earth-element-doped optical fiber such that only the pumping light component in the fundamental mode and a signal light component in the fundamental mode propagate through the first rare-earth-element-doped optical fiber in a state where the first rare-earth-element-doped optical fiber extends straight.

5 Claims, 19 Drawing Sheets

US 7,760,423 B2

OPTICAL AMPLIFIER

CROSS-REFERENCE TO RELATED APPLICATION

This application claims priority to the commonly assigned U.S. Provisional Application No. 60/796,539 filed on May 2, 2006, which application is fully incorporated by reference herein.

BACKGROUND OF THE INVENTION

1. Field of the Invention

The present invention relates to an optical amplifier which can amplify a plurality of channels of signal light having wavelengths different from each other.

2. Related Background Art

In a photonic network 100 shown in FIG. 1, optical ADMs 101 to 104 and optical XCs are arranged on a network including a plurality of optical amplifiers 111 to 114, whereby the number of channels of signal light inputted into the optical amplifiers 111 to 114 and the power of these channels may fluctuate. One of important performances required for such an optical amplifier is a transient response characteristic in high-speed automatic gain control (AGC). When signal light whose power is fluctuated by an optical ADM is inputted into an optical amplifier as shown in FIG. 1, the gain of signal light remaining in an optical amplifier medium may fluctuate within the optical amplifier.

When the input signal light power decreases, a phenomenon (overshoot) in which the gain fluctuation of signal light consistently remaining in the optical amplifier medium transiently increases too much occurs in general. When the input signal power increases, on the other hand, a phenomenon (undershoot) in which the gain fluctuation of signal light consistently remaining in the optical amplifier medium transiently decreases too much occurs. Both the overshoot and undershoot have been known to adversely affect optical transmission systems. The overshoot may cause an excessive power input to make receivers out of order. The undershoot may deteriorate the power on the outside of a receivable range, thereby causing transmission errors. These make it necessary to suppress the over/undershoot in order to realize a high-quality optical transmission system.

Known as an optical amplifier widely utilized in known optical transmission systems is a structure in which an optical fiber having an optical waveguide region doped with a rare-earth element is included as an optical amplifier medium. In particular, optical amplifiers (EDFAs: Erbium-Doped Fiber Amplifiers) including an optical fiber (EDF) doped with erbium as a rare-earth element have been widely used. For suppressing the over/undershoot, conventional EDFAs have monitored input/output signal powers and regulated the pumping light power at a high speed so as to keep a constant amplification gain. In the optical amplifiers disclosed in Patent Documents 1 to 5, rare-earth-element-doped optical fibers whose cutoff wavelength is set longer than the pumping light wavelength but shorter than the signal light wavelength in order to suppress the over/undershoot are employed as optical amplifier media. Patent Document 6 discloses a technique in which a fiber propagating signal light is bent, so as to eliminate signal light components of modes higher than the fundamental mode.

Patent Document 1: Japanese Patent Application Laid-Open No. 2001-168427

Patent Document 2: Japanese Patent Application Laid-Open No. 2001-127365

Patent Document 3: Japanese Patent Application Laid-Open No. HEI 10-012952

Patent Document 4: Japanese Patent Application Laid-Open No. HEI 10-270785

Patent Document 5: Japanese Patent Application Laid-Open No. HEI 10-303490

Patent Document 6: Japanese Patent Application Laid-Open No. HEI 4-298724

SUMMARY OF THE INVENTION

The present inventors have examined the above prior art, and as a result, have discovered the following problems.

Namely, the conventional optical amplifiers including those described in the above-mentioned Patent Documents 1 to 5 have been insufficient for suppressing the over/undershoot in transient responses in high-speed AGC, whereby the transmission quality of the whole optical transmission system has become unstable.

For overcoming the above-mentioned problem, it is an object of the present invention to provide an optical amplifier having a structure for more effectively suppressing the over/undershoot in transient responses in high-speed AGC.

The optical amplifier according to the present invention is an optical device for amplifying signal light including a plurality of channels (signal channels) having wavelengths different from each other, and comprises a pumping light source, a first rare-earth-element-doped optical fiber, an input signal light monitor section, an output signal light monitor section, and a control section. The pumping light source outputs pumping light. The first rare-earth-element-doped optical fiber is an optical amplifier medium which amplifies signal light propagating therethrough by supply of the pumping light from the pumping light source. The input signal light monitor section monitors a power of the signal light inputted into the rare-earth-element-doped optical fiber. The output signal light monitor section monitors a power of the signal light outputted from the first rare-earth-element-doped optical fiber. The control section inputs therein respective monitoring results of the input and output signal light monitor sections, and regulates the pumping light source such that a gain determined according to the monitoring results becomes a target gain by power control of the pumping light to be supplied to the first rare-earth-element-doped optical fiber.

In particular, the first rare-earth-element-doped optical fiber in the optical amplifier according to the present invention has a cutoff wavelength set longer than the pumping light wavelength but shorter than the signal light wavelength, and mainly propagates therethrough a pumping light component in a fundamental mode. The pumping light and signal light are made incident on the first rare-earth-element-doped optical fiber such that only the pumping light component in the fundamental mode and a signal light component in the fundamental mode propagate through the first rare-earth-element-doped optical fiber in a state where the first rare-earth-element-doped optical fiber extends straight. Here, the "state where the first rare-earth-element-doped optical fiber extends straight" does not represent a state of placement (state of use) of the first rare-earth-element-doped optical fiber. The first rare-earth-element-doped optical fiber may be placed either in a straightly extended state or in a bent state. Alternatively, in the optical amplifier according to the present invention, the first rare-earth-element-doped optical fiber has a cutoff wavelength set longer than the pumping light wavelength but shorter than the signal light wavelength, while the pumping light is made incident on the first rare-earth-element-doped optical fiber such that a pumping light component in a third-order mode or higher propagates through the first rare-earth-element-doped optical fiber.

Preferably, in the optical amplifier according to the present invention, the time elapsing from an input signal light power fluctuation until the control section instructs the pumping light source to regulate the pumping light power is 1 millisecond or less. The optical amplifier according to the present invention may further comprise a second rare-earth-element-doped optical fiber arranged downstream of the first rare-earth-element-doped optical fiber such as to receive the pumping light outputted from the first rare-earth-element-doped optical fiber. The second rare-earth-element-doped optical fiber has a cutoff wavelength shorter than the pumping light wavelength and further amplifies the signal light having amplified by the first rare-earth-element-doped optical fiber. Specifically, the optical amplifier may be an EDFA which amplifies signal light included in a C band whose wavelength ranges from 1530 nm to 1565 nm by supply of pumping light in a 980-nm nm wavelength band (980 nm±10 nm) or an EDFA which amplifies signal light included in an L band whose wavelength ranges from 1570 nm to 1610 nm by supply of pumping light in a 1480-nm wavelength band (1480 nm±10 nm).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the optical amplifier according to the present invention will be explained in detail with reference to FIGS. 2 to 19. In the explanation of the drawings, the same parts and the same constituents will be referred to with the same numerals without repeating their overlapping descriptions.

Figure 2:
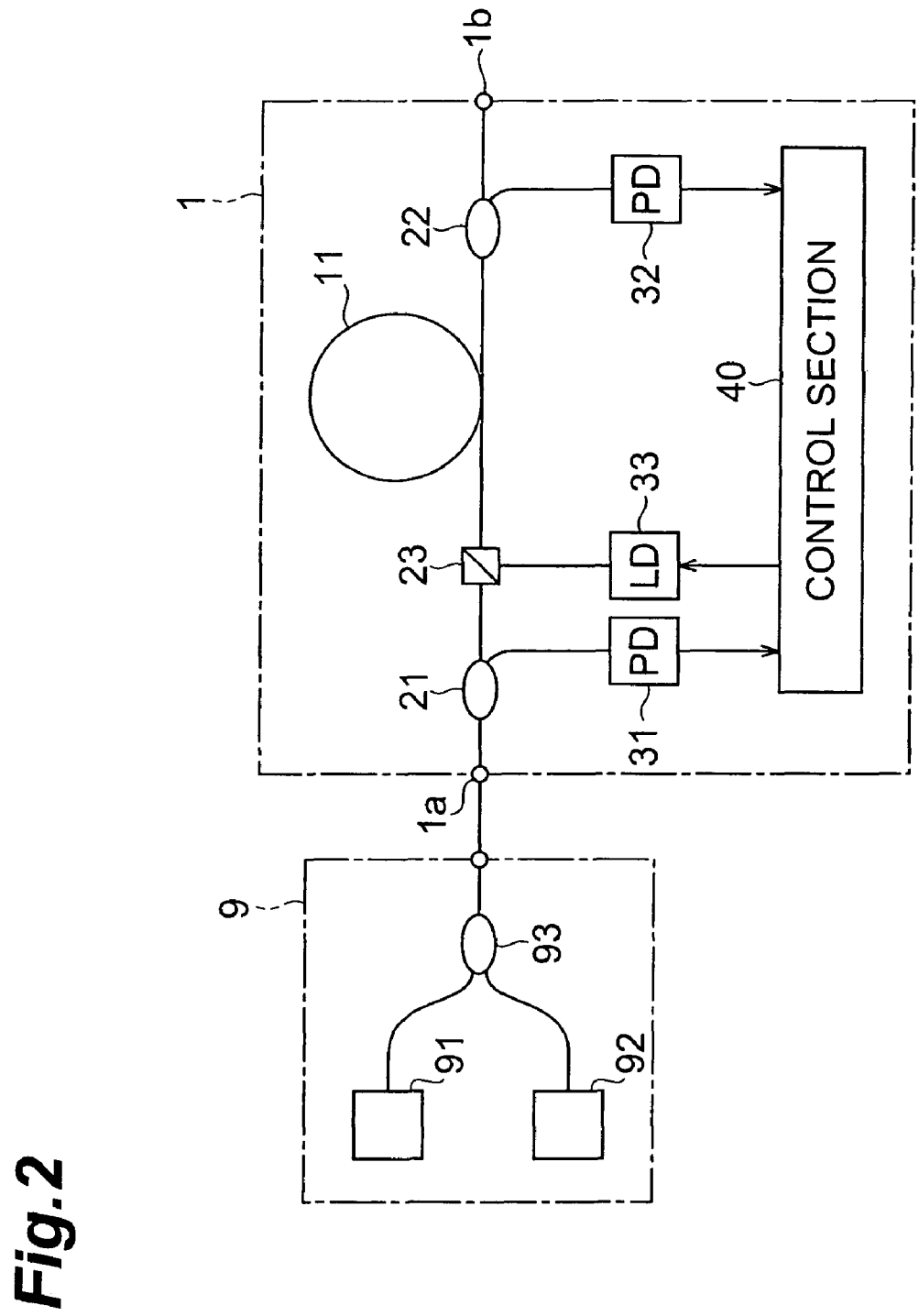
FIG. 2 is a view showing the structure of a first embodiment of the optical amplifier according to the present invention.

FIG. 2 is a view showing the structure of a first embodiment of the optical amplifier according to the present invention. FIG. 2 illustrates, in addition to the optical amplifier 1 according to the first embodiment that amplifies signal light, a light source section 9 which outputs signal light to be inputted into the optical amplifier 1. The optical amplifier 1 is an optical device which comprises an input end 1a and an output end 1b, amplifies signal light taken therein through the input end 1a, and outputs the amplified signal from the output end 1b. The optical amplifier 1 also comprises a rare-earth-element-doped optical fiber 11 (first rare-earth-element-doped optical fiber), optical couplers 21 to 23, light-receiving sections 31, 32, a pumping light source 33, and a control section 40 which are successively arranged from the input end 1a to the output end 1b.

The rare-earth-element-doped optical fiber 11 is an optical fiber having an optical waveguide region doped with a rare-earth element, and amplifies signal light propagating therethrough when fed with pumping light. Specifically, the rare-earth-element-doped optical fiber 11 is constructed by a core region (a rare-earth-element-doped region where signal light and pumping light propagate) doped with a rare-earth element such as Er and a cladding region (a region for confining light propagating through the core region), provided on the outer periphery of the core region, having a refractive index lower than that of the core region, and has a step index type refractive index profile. The pumping light source 33 outputs the pumping light to be supplied to the rare-earth-element-doped optical fiber 11, and preferably includes a laser diode. The optical coupler 23 guides the pumping light outputted from the pumping light source 33 to the rare-earth-element-doped optical fiber 11, and the signal light having arrived from the optical coupler 21 to the rare-earth-element-doped optical fiber 11. The input end 1a and optical couplers 21 and 23 are placed while being aligned with the rare-earth-element-doped optical fiber 11 such that only the pumping light component in the fundamental mode and the signal light component in the fundamental mode propagate through the rare-earth-element-doped optical fiber 11 in a state where the first rare-earth-element-doped optical fiber 11 extends straight. Here, the "state where the first rare-earth-element-doped optical fiber extends straight" does not represent a state of placement (state of use) of the first rare-earth-element-doped optical fiber. The first rare-earth-element-doped optical fiber may be placed either in a straightly extended state or in a bent state.

The optical coupler 21 is arranged between the input end 1a and optical coupler 23, and branches out a part of the signal light propagating from the input end 1a to the optical coupler 23. The branched signal light is partially outputted to the light-receiving section 31. The light-receiving section 31, which preferably includes a photodiode, receives a part of the signal light having arrived from the optical coupler 21 and outputs an electric signal at a value corresponding to the amount of light received. The optical coupler 21 and light-receiving section 31 function as an input signal light monitor section for monitoring the power of signal light taken therein through the input end 1a.

The optical coupler 22 is arranged between the rare-earth-element-doped optical fiber 11 and output end 1b, and branches out a part of the signal light propagating from the rare-earth-element-doped optical fiber 11 to the output end 1b. A part of the branched signal light is outputted to the light-receiving section 32. The light-receiving section, which preferably includes a photodiode, receives a part of the signal light having arrived from the optical coupler 22 and outputs an electric signal at a value corresponding to the amount of light received. The optical coupler 22 and light-receiving section 32 function as an output signal light monitor section for monitoring the power of signal light to be outputted through the output end 1b.

The control section 40 inputs therein the respective monitoring results obtained by the input signal light monitor section and output signal light monitor section, and regulates the pumping light source 33 such that a gain determined according to these monitoring results becomes a target gain by power adjustment of the pumping light to be supplied to the rare-earth-element-doped optical fiber 11. Namely, the control section performs automatic gain control (AGC).

The light source section 9 comprises, as a device for outputting signal light to be inputted into the optical amplifier 1, a modulated signal light source 91, a residual signal light source 92, and an optical coupler 93. The modulated signal light source 91 outputs pulsed light having a fixed pulse height at a predetermined period as signal light. The modulated signal light source 91 may comprise a plurality of channel signal light sources for outputting a plurality of channels of signals having wavelengths different from each other. The residual signal light source 92 outputs continuous light having a fixed power as signal light. The optical coupler 93 multiplexes the respective signal light components outputted from the modulated signal light source 91 and residual signal light source 92, and outputs thus multiplexed signal light to the input end 1a of the optical amplifier 1.

In the optical amplifier 1, the pumping light outputted from the pumping light source 33 is fed to the rare-earth-element-doped optical fiber 11 through the optical coupler 23. The signal light taken in through the input end 1a reaches the rare-earth-element-doped optical fiber 11 by way of the optical couplers 21 and 23. The signal light having arrived is amplified within the rare-earth-element-doped optical fiber 11. The amplified signal light passes through the optical coupler 22, so as to be outputted from the output end 1b.

A part of the signal light taken in through the input end 1a is branched out by the optical coupler 21, so as to reach the light-receiving section 31. The light-receiving section 31 detects the power of a part of the signal light having arrived, thereby monitoring the input signal light power. A part of the signal light to be outputted from the output end 1b is branched out by the optical coupler 22, so as to reach the light-receiving section 32. The light-receiving section 32 detects a part of the signal light having arrived, thereby monitoring the output signal light power. The respective monitoring results of the input signal light power and output signal light power are fed into the control section 40. The control section 40 outputs a control signal to the pumping light source 33 such that a gain determined according to the monitoring results becomes a target gain by power adjustment of the pumping light to be supplied to the rare-earth-element-doped optical fiber 11. The pumping light source 33 having received the control signal for the pumping light power adjustment regulates the pumping light output power according to the control signal.

In the optical amplifier 1 according to this embodiment in particular, the rare-earth-element-doped optical fiber 11 has a cutoff wavelength $\lambda c$ set longer than the pumping light wavelength $\lambda p$ but shorter than the signal light wavelength $\lambda s$, and mainly propagates therethrough a pumping light component in the fundamental mode. The pumping light and signal light are made incident on the rare-earth-element-doped optical fiber 11 such that only the pumping light source component in the fundamental mode and a signal light component in the fundamental mode propagate through the rare-earth-element-doped optical fiber 11 in a state where the rare-earth-element-doped optical fiber 11 extends straight (a state for defining a fiber characteristic). Alternatively, in the optical amplifier 1 according to this embodiment, the cutoff wavelength $\lambda c$ of the rare-earth-element-doped optical fiber 11 is set longer than the pumping light wavelength $\lambda p$ but shorter than the signal light wavelength $\lambda s$, while the pumping light is made incident on the rare-earth-element-doped optical fiber 11 such that only a pumping light source component in the third-order mode or higher propagates through the rare-earth-element-doped optical fiber 11.

In the following, assuming that the rare-earth-element-doped optical fiber 11 is an EDF, the pumping light wavelength $\lambda p$ is 980 nm, and the signal light wavelength $\lambda s$ is 1530 nm to 1560 nm (or 1530 nm to 1563 nm), an EDFA which is the optical amplifier 1 will further be explained in detail. The optical amplifier 1 may be either an EDFA which amplifies signal light included in a C band whose wavelength ranges from 1530 nm to 1565 nm by the supply of pumping light in a 980-nm wavelength band (980 nm±10 nm) as such or an EDFA which amplifies signal light included in an L band whose wavelength ranges from 1570 nm to 1610 nm by the supply of pumping light in a 1480-nm wavelength band (1480 nm±10 nm).

Figure 3:
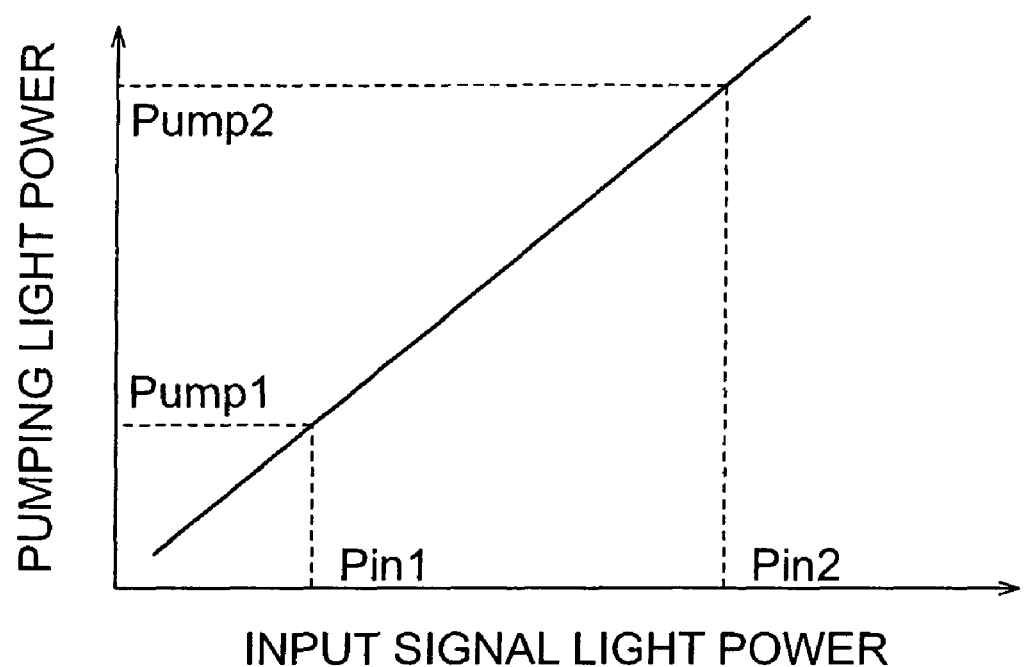
FIG. 3 is a graph for explaining the relationship between input signal power and pumping light power.

As a general characteristic of an EDFA, a linear relationship holds between input signal light power and pumping light power as shown in FIG. 3 when performing automatic gain control of signal light. FIG. 3 schematically illustrates a line for keeping gain at a fixed target gain. This structure in which the respective pumping light powers at the time when the input signal light power is at Pin1 and Pin2 are set to Pump1 and Pump2 can keep a substantially constant gain. Namely, this makes it clear that the pumping light power is needed to be controlled rapidly in order to keep a constant gain at a high speed.

Figure 1:
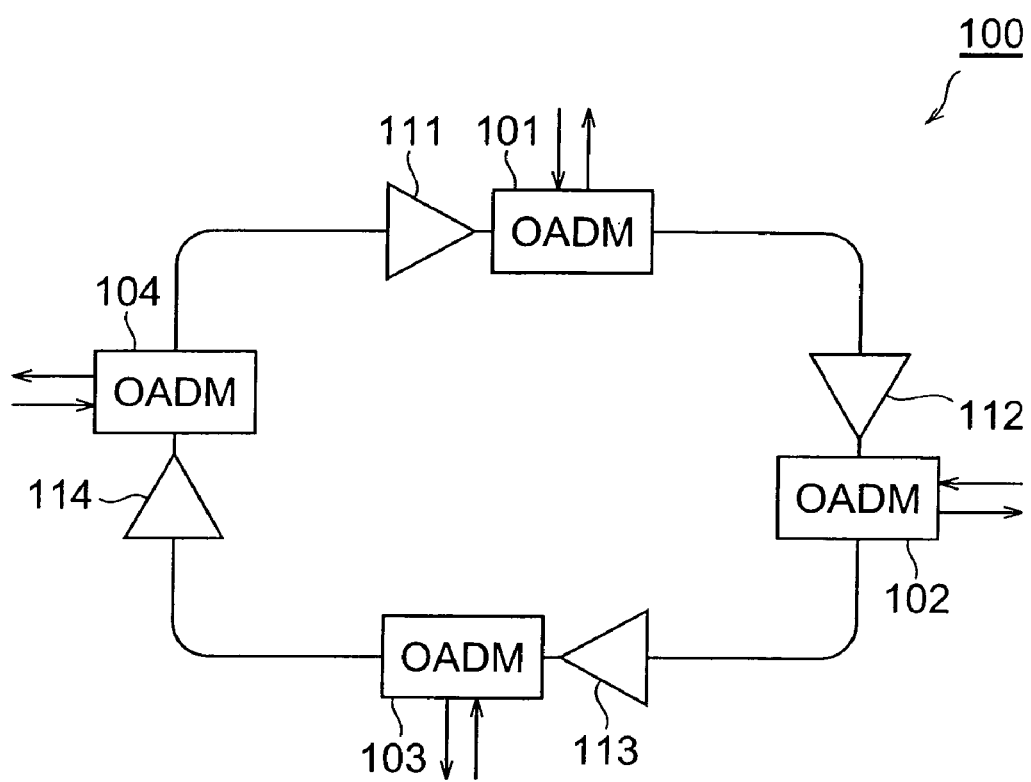
FIG. 1 is a view showing a schematic structure of a photonic network.
Figure 4:
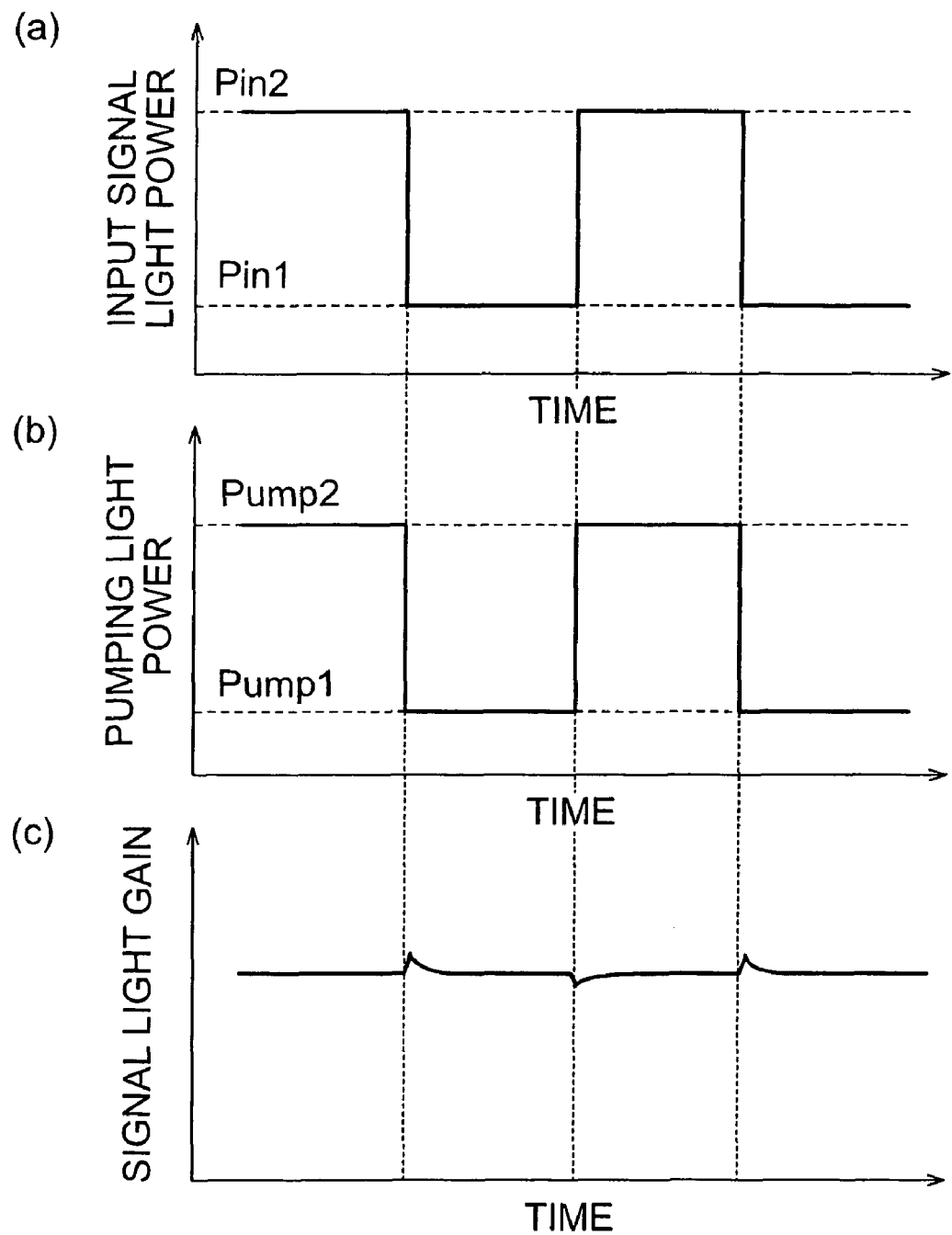
FIG. 4 is a graph showing respective temporal fluctuations in input signal light power, pumping light power, and signal light gain when the pumping light power is changed simultaneously with timings at which the input signal power increases and decreases.

In view of features of the EDFA mentioned above, the occurrence of over/undershoot in a photonic network such as the one shown in FIG. 1 will be explained. FIG. 4 is a graph showing respective temporal fluctuations in input signal light power, pumping light power, and signal light gain when the pumping light power is changed simultaneously with timings at which the input signal power increases and decreases. In particular, the area (a) is a graph showing a temporal fluctuation of the input signal light power, the area (b) is a graph showing a temporal fluctuation of the pumping light power, and the area (c) is a graph showing a temporal fluctuation of the signal light gain remaining within the EDF.

As shown in FIG. 3, the pumping light power is needed to be changed in accordance with the input signal power in order to keep a constant gain. Therefore, in the example shown in FIG. 4, the pumping light power is kept high and low when the input signal light power is high and low, respectively, whereby the signal light gain is regulated constant. Even when the pumping light power is changed simultaneously with a fluctuation in the input signal light power, the over/undershoot may occur in a gain fluctuation of signal light remaining in the EDFA. Known as causes therefor are the amplification characteristic and pumping light wavelength dependency of the rare-earth element added to the amplification fiber employed.

Figure 5:
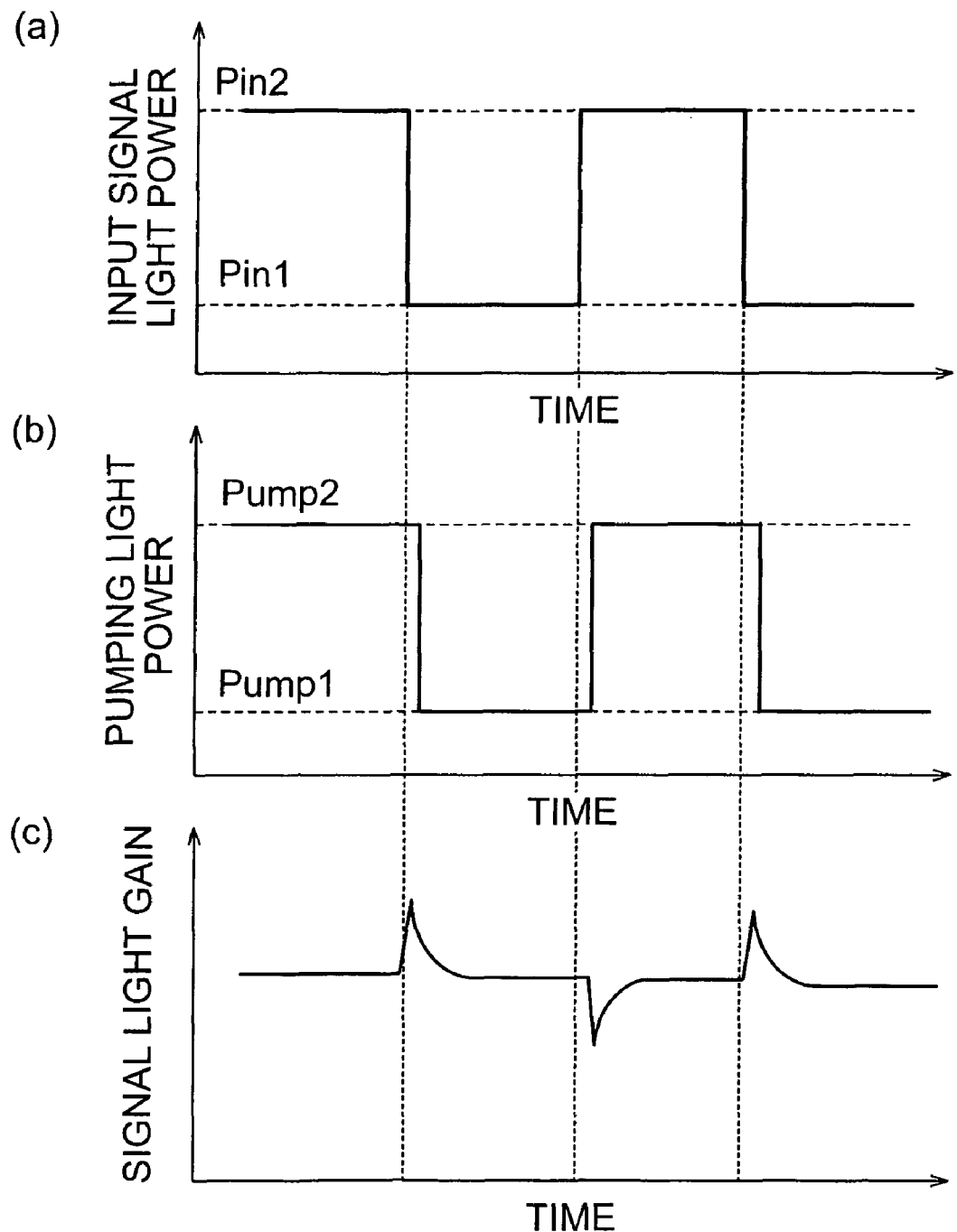
FIG. 5 is a graph showing respective temporal fluctuations in input signal light power, pumping light power, and signal light gain when the pumping light power is changed with a delay from timings at which the input signal power increases and decreases.

A case where the pumping light power is not changed simultaneously as the input signal light power changes will now be considered. This assumes a case where an actual control board is utilized. As the time elapsing until the pumping light power converges such that the signal light gain becomes constant is shorter, the over/undershoot of the gain fluctuation can be made smaller. As the time elapsing until the pumping light power converges is longer, however, the over/undershoot becomes greater. FIG. 5 is a graph showing respective temporal fluctuations in input signal light power, pumping light power, and signal light gain when the pumping light power is changed with a delay from timings at which the input signal power increases and decreases. In particular, the area (a) is a graph showing a temporal fluctuation of the input signal light power, the area (b) is a graph showing a temporal fluctuation of the pumping light power, and the area (c) is a graph showing a temporal fluctuation of the signal light gain remaining within the EDF. When the pumping light power is changed with a delay from timings at which the input signal light power increases and decreases, the signal light gain overshoots or undershoots as shown in FIG. 5.

Figure 6:
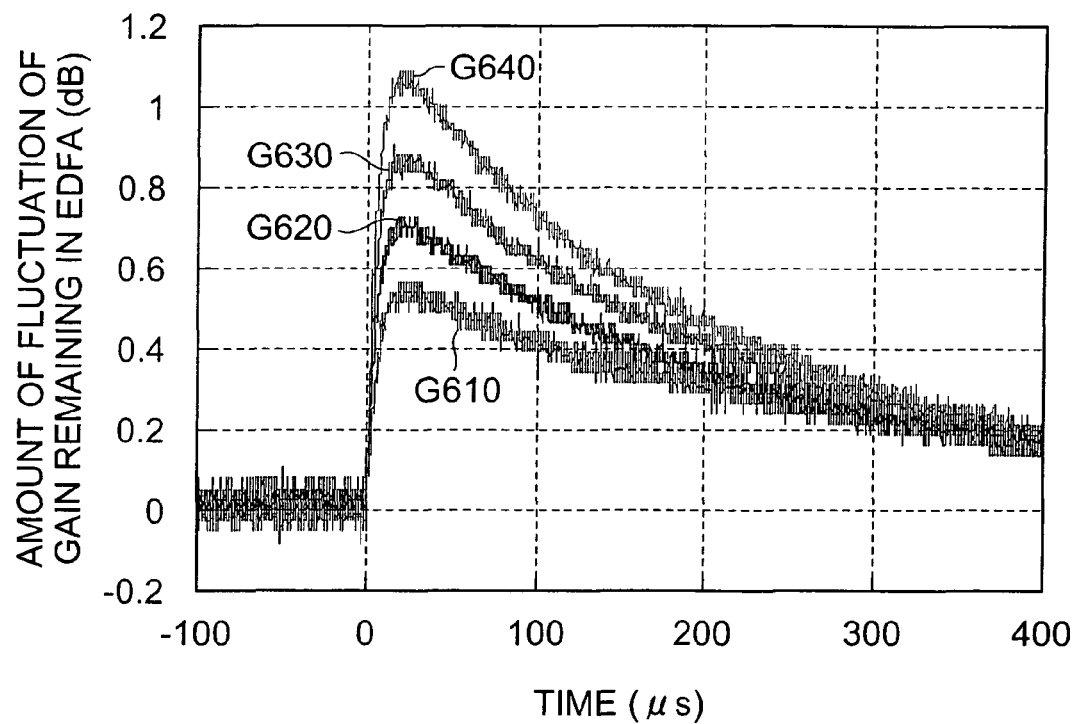
FIG. 6 is a graph showing temporal changes in signal light gain when the pumping light power is changed with delays from timings at which the input signal light power increases and decreases in an EDF having a small core diameter (2.5 µm)

FIG. 6 is a graph showing temporal changes in signal light gain (gain fluctuations in signal light remaining within the EDF) when the pumping light power is changed with delays from timings at which the input signal light power increases and decreases. The graph shown in FIG. 6 represents results of measurement obtained when the power of modulated signal light outputted from the modulated signal light source 91 and the power of residual signal light outputted from the residual signal light source 92 are set to −5 dBm and −21 dBm, respectively, while the pumping light power is changed simultaneously with timings at which the input signal light power increases and decreases in the optical amplifier having the structure shown in FIG. 2. In FIG. 6, the curve G610 shows a gain fluctuation obtained when AGC is performed with delay of 0 μs from ON/OFF of the modulated signal light, the curve G620 shows a gain fluctuation obtained when AGC is performed with delay of 1 μs from ON/OFF of the modulated signal light, the curve G630 shows a gain fluctuation obtained when AGC is performed with delay of 2 μs from ON/OFF of the modulated signal light, and the curve G640 shows a gain fluctuation obtained when AGC is performed with delay of 3 μs from ON/OFF of the modulated signal light. The pumping light power is set such that the gain of the signal light remaining in the EDFA becomes constant at 21 dB (pumping light power Pump1 is set with respect to input signal light power Pin1 in FIG. 6). The gain of residual signal light is 21 dB even in a state where the input signal light power is high as a matter of course. Employed as the EDF is an EDF sample having a cutoff wavelength of 900 nm, a core diameter of 2.5 μm, and a length of 19 m.

Figure 7:
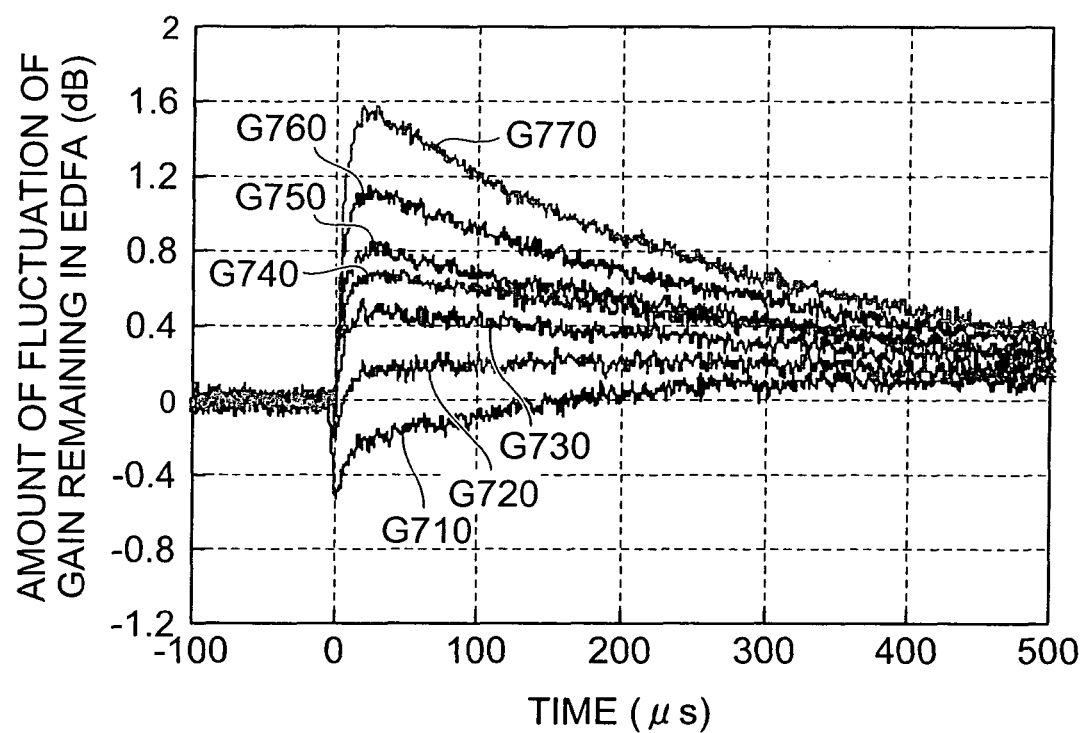
FIG. 7 is a graph showing temporal changes in signal light gain when the pumping light power is changed before and after timings at which the input signal light power increases and decreases in an EDF having a small core diameter (2.8 µm)

FIG. 7 is also a graph showing temporal changes in signal light gain (gain fluctuations in signal light remaining within the EDF) when the pumping light power is changed before and after timings at which the input signal light power increases and decreases. However, the graph shown in FIG. 7 represents results of measurement of an EDF sample having a core diameter of 2.8 μm. In FIG. 7, the curve G710 shows a gain fluctuation obtained when AGC is performed with delay of 5 μs from ON/OFF of the modulated signal light, the curve G720 shows a gain fluctuation obtained when AGC is performed with delay of 3 μs from ON/OFF of the modulated signal light, the curve G730 shows a gain fluctuation obtained when AGC is performed with delay of 1 μs from ON/OFF of the modulated signal light, the curve G740 shows a gain fluctuation obtained when AGC is performed with delay of 0 μs from ON/OFF of the modulated signal light, the curve G750 shows a gain fluctuation obtained when AGC is performed with delay of −1 μs from ON/OFF of the modulated signal light, the curve G760 shows a gain fluctuation obtained when AGC is performed with delay of −3 μs from ON/OFF of the modulated signal light, and the curve G770 shows a gain fluctuation obtained when AGC is performed with delay of −5 μs from ON/OFF of the modulated signal light.

The EDF sample with a core diameter of 2.8 μm prepared for measurement in FIG. 7 has mode field diameters of 3.2 μm and 5.5 μm for wavelengths 980 nm and 1550 nm of light, respectively. The cutoff wavelength of the EDF sample is 898 nm. The measurement in FIG. 7 is also performed with an optical amplifier having the structure shown in FIG. 2. Namely, the power of the modulated signal light (having eight channels whose wavelengths range from 1530 nm to 1563 nm) outputted from the modulated signal light source 91 is set to −5 dBm, the power of the residual signal light (having one channel at a wavelength of 1550 nm) outputted from the residual signal light source 92 is set to −21 dBm, and the pumping light power is changed before and after a timing at which the input signal light power drops by 16 dB. The pumping light power is set such that the gain of the signal light remaining in the EDFA becomes constant at 21 dB. The gain of the residual signal light is 21 dB even in the state where the input signal light power is high as a matter of course.

In each of FIGS. 6 and 7, a point of time where the input signal light changes by about 16 dB from a high state (Pin2) to a low state (Pin1) is taken as a reference (time 0). As can be understood from FIG. 6, the gain of the residual signal light increases as the delay from the time at which the input signal light power fluctuates to the time at which the pumping light power changes is longer. Specifically, the overshoot of about 0.56 dB occurs at the delay of 0 μs, whereas the overshoot of about 1.1 dB occurs at the delay of 3 μs. The overshoot increases as the delay is longer in FIG. 7 as in FIG. 6. When the delay is minus (the pumping light power changes prior to the time at which the input signal light power fluctuates), on the other hand, an undershoot of about −0.4 dB occurs.

Figure 8:
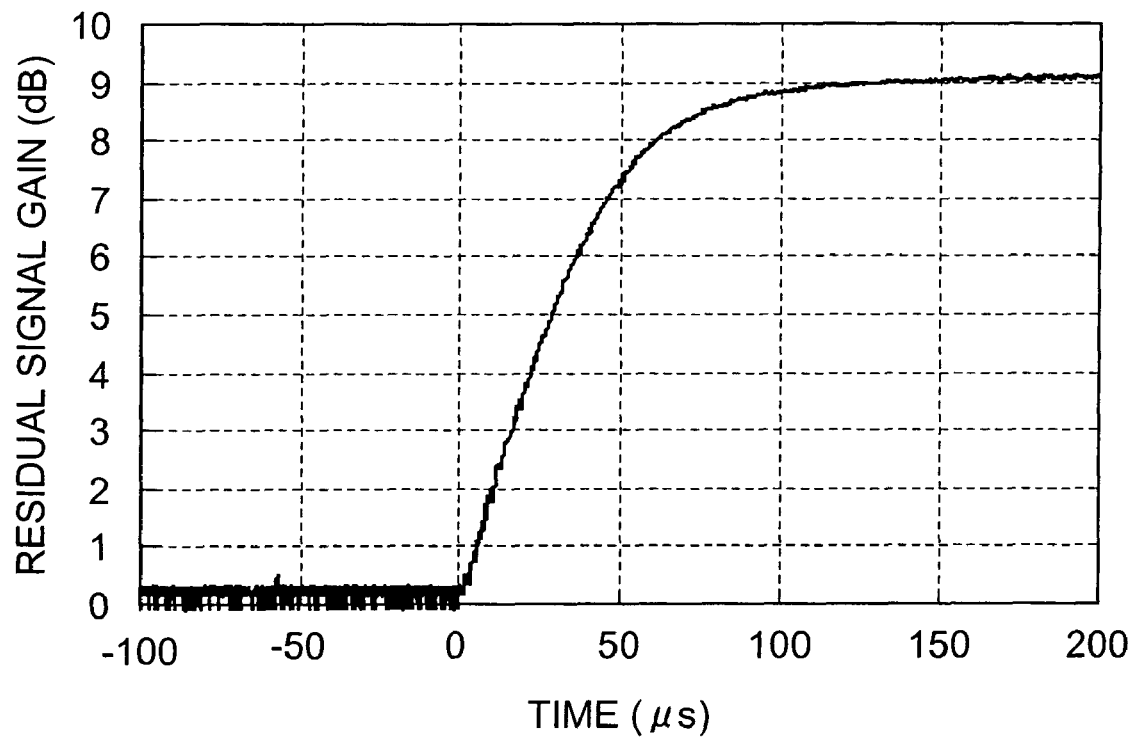
FIG. 8 is a graph showing temporal changes in signal light when the pumping light power is unchanged with respect to increases and decreases in the input signal light power.

FIG. 8 is a graph showing temporal changes in signal light when the pumping light power is unchanged with respect to increases and decreases in the input signal light power. The graph shown in FIG. 8 represents results of measurement of signal light gain when the input signal light power changes by about 16 dB, for example, from the high state (Pin2) to the low state (Pin1) while the pumping light power is fixed at Pump2. The point of time at which the input signal light power changes from the high state (Pin2) to the low state (Pin1) is also taken as a reference (time 0) in FIG. 8. The measurement in FIG. 8 is performed under the same measurement condition as that of the measurement in FIG. 6, whereby an EDF sample having a cutoff wavelength of 900 nm, a core diameter of 2.5 μm, and a length of 19 m is used in the optical amplifier having the structure shown in FIG. 2.

As can be understood from FIG. 8, the residual signal gain increases to about 9 dB over a period of about 100 μs, and then converges at about 9 dB. Namely, it shows that the overshoot cannot be suppressed even when the pumping light is moved such that the signal light remaining in the EDFA becomes constant after the lapse of about 100 μs or more from the instant at which the input signal light power to the EDFA changes from the high state to the low state. The time required for the gain remaining in the EDFA to converge depends on three causes, i.e., the amount of change in input signal light power to the EDFA, the power of signal light remaining in the EDFA, and the gain given to the EDFA, and is about 100 μs to 1 ms.

Figure 9:
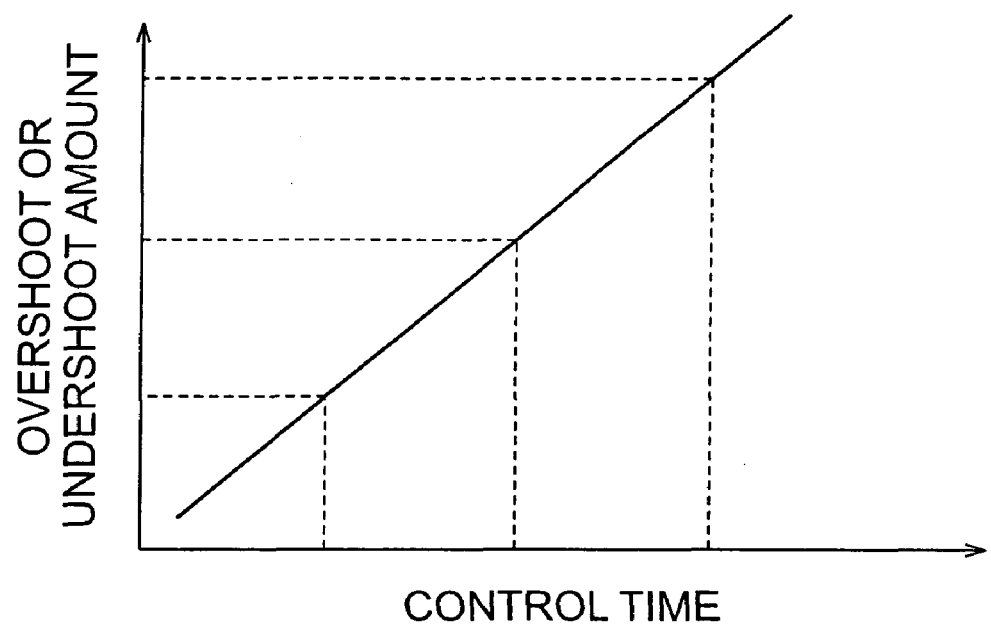
FIG. 9 is a graph showing the relationship between the pumping control time and the amount of over/undershoot generated.

FIG. 9 is a graph showing the relationship between the pumping light control time and the amount of over/undershoot generated. As can be understood from this graph, the over/undershoot can be made smaller as the control time is faster. In view of the above-mentioned three causes, how to control the pumping light faster has been studied heretofore. By contrast, the present invention suppresses the over/undershoot by a new method, which will be explained in the following, according to a theory by which the over/undershoot occurs as the input signal light power fluctuates.

The amount of overshoot is represented by the following expressions:

$$P_k^{OUT}(t) - P_k^{OUT}(0) = \Delta P_k^{OUT} \times (1 - \exp(-t/\tau_e)) \quad (1)$$

$$\tau_e = \frac{\tau}{1 + \sum_j \frac{P_j^{OUT}}{P_j^{IS}}} \quad (2)$$

$$P_j^{IS} = \frac{h v_j N_t S}{(g_j^* + \alpha_j)\tau} \quad (3)$$

where $P_k^{OUT}(t)$ is the logarithmic output power at time t, $P_k^{OUT}(0)$ is the logarithmic output power before the input signal light power changes, $\Delta P_k^{out}$ is the static output change amount, $\tau_e$ is the effective time constant, $\tau$ is the transition time from the $^4I_{11/2}$ level to the $^4I_{13/2}$ level, $P_j^{OUT}$ is the output power, $P_j^{IS}$ is the saturated power, h is the Planck's constant, $v_j$ is the frequency, $N_t$ is the erbium ion concentration, S is the area doped with erbium ions, $g_j^*$ is the gain factor, and $\alpha_j$ is the absorption coefficient.

The above-mentioned expression (1) is an expression representing the amount of over/undershoot occurring as the input signal light power fluctuates as shown in FIG. 6. This expression (1) shows that the amount of increase in over/undershoot per unit time depends on the effective time constant $\tau_e$. The above-mentioned expression (2) shows that the effective time constant $\tau_e$ depends on the saturated power $P_j^{IS}$. The above-mentioned expression (3) is an expression representing the saturated power $P_j^{IS}$. These expressions (1) to (3) make it clear that the effective time constant $\tau_e$ is required to be increased in order to reduce the amount of over/undershoot generated. They show that the rise response rate of the overshoot becomes lower as the effective time constant $\tau_e$ is greater, whereby the amount of overshoot per unit time decreases.

Namely, changing the saturated power $P_j^{IS}$ can alter the response rate of the overshoot amount. As shown in the above-mentioned expression (3), the saturated power $P_j^{IS}$ is in proportion to the erbium ion-doped area S in the optical fiber. When the cross-sectional area of the core of the optical fiber is uniformly doped with erbium ions, the saturated power $P_j^{IS}$ becomes greater as the core cross-sectional area is made larger, which makes it possible to reduce the amount of overshoot.

Figure 10:
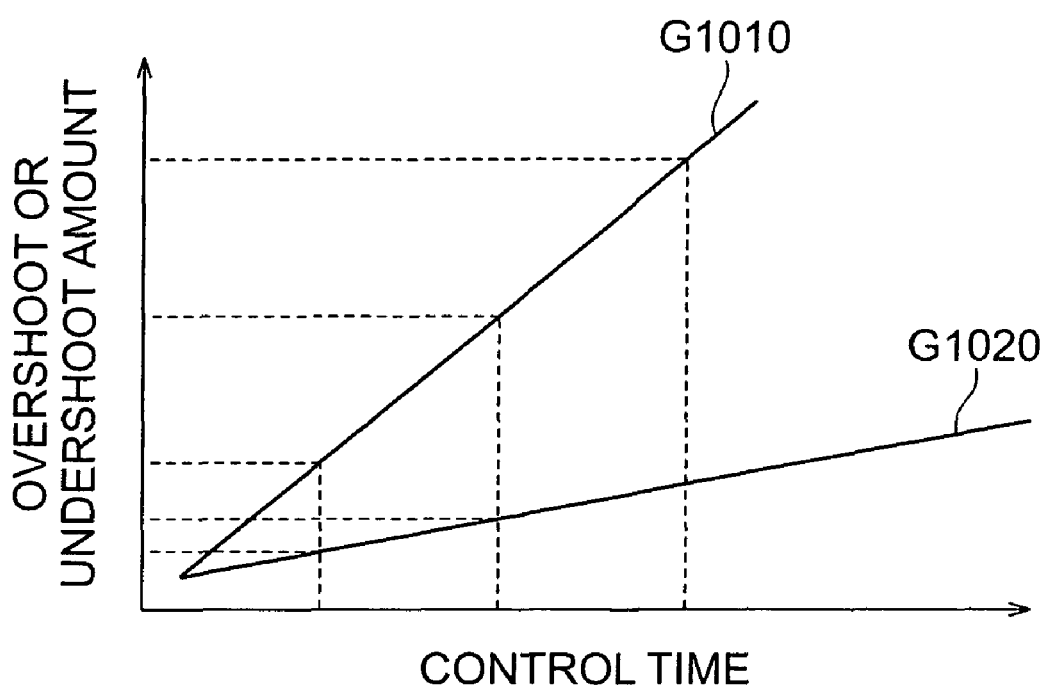
FIG. 10 is a graph showing the amount of over/undershoot occurring per unit time when the saturated power is made greater.

FIG. 10 is a graph showing the amount of over/undershoot occurring per unit time when the saturated power is made greater. As can be understood from the above-mentioned expressions (1) to (3), the amount of over/undershoot per control time becomes smaller as the saturated power $P_j^{IS}$ is made greater. Even when the control time required for the signal light gain to reach a target value is longer, for example, increasing the saturated power $P_j^{IS}$ can yield a value of over/undershoot on a par with that of a board having a high-speed control function.

The cutoff wavelength of the optical fiber is a structural parameter related to the core cross-sectional area, and has been known to shift to the longer wavelength side as the core cross-sectional area is made larger. The cutoff wavelength λc of an optical fiber for optical amplification explained here is defined in general as the cutoff wavelength in the second-order (LP$_{11}$) mode in a state where an optical fiber for optical amplification having a length of 2 m is loosely wound by one turn at a diameter of 140 mm (ITU-G.650). The cutoff wavelength λc is preferably used when the optical amplifier 1 is a rare-earth-element-doped optical fiber amplifier while the optical fiber for optical amplification has a length of several to several hundreds of meters.

An experiment was conducted while actually using an amplification fiber having a cutoff wavelength λc longer than the pumping wavelength λp. The experimental structure was the same as with FIG. 2. The experimental condition was the same as that of the experiment in FIG. 6 using an EDF sample having a cutoff wavelength λc of 900 nm. The modulated signal light power and the residual signal light power were set to −5 dBm and −21 dBm, respectively. The EDF sample was adjusted to the same absorption product as with the cutoff wavelength of 980 nm so as to have a length of 5 m in order to yield a gain of 21 dB, while having a cutoff wavelength of 1390 nm and a core diameter of 5.1 μm.

Figure 11:
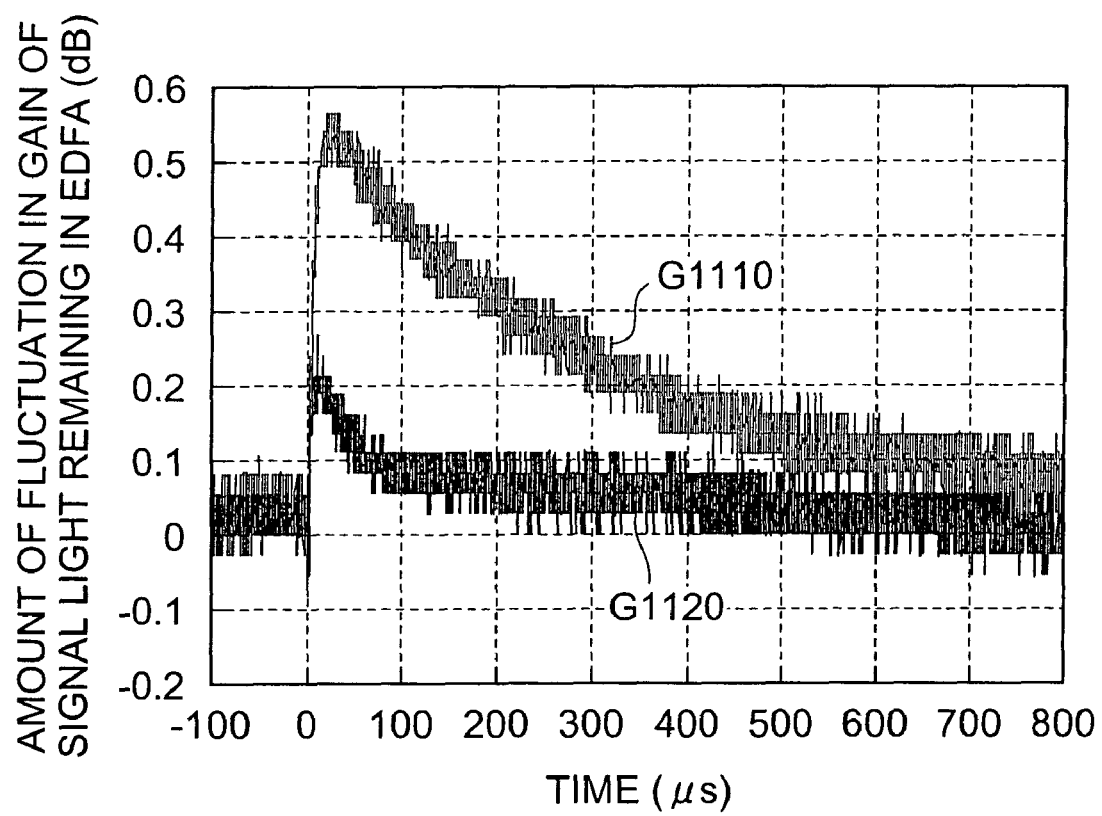
FIG. 11 is a graph showing temporal changes in gain when pumping light is changed such that signal light remaining in EDFAs becomes constant simultaneously with timings at which modulated signal light is turned ON/OFF.

FIG. 11 is a graph showing temporal changes in gain when pumping light is changed such that signal light remaining in EDFAs becomes constant simultaneously with timings at which modulated signal light is turned ON/OFF. In FIG. 11, the curve G 1110 shows the temporal change of gain in an EDF sample according to a comparative example having a cutoff wavelength is 900 nm, whereas the curve G1120 shows the temporal change of gain in an EDF sample having a cutoff wavelength of 1390 nm. As can be understood from FIG. 11, an overshoot of about 0.56 dB occurs when employing the EDF sample according to the comparative example having a cutoff wavelength of 900 nm and a core diameter of 2.5 μm. When the EDF sample having a cutoff wavelength of 1390 nm and a core diameter of 5.1 μm is employed, on the other hand, the overshoot is suppressed to about 0.28 dB. This makes it clear that employing an amplification optical fiber having a larger core diameter (i.e., an amplification fiber having a cutoff wavelength longer than the pumping light wavelength) in the optical amplifier is more effective in suppressing the over/undershoot along with input signal light power fluctuations as compared with the case employing an amplification fiber having a cutoff wavelength shorter than the pumping light wavelength in the optical amplifier.

For specifically verifying the effect of suppressing the over/undershoot in transient responses in high-speed AGC by enlarging the core diameter as mentioned above, four kinds of EDF samples with different core diameters were prepared and subjected to various kinds of measurement.

Prepared EDF sample 1 has a core diameter of 2.8 μm, a mode field diameter of 3.2 μm with respect to light of a wavelength of 980 nm, a mode field diameter of 5.5 μm with respect to light of a wavelength of 1550 nm, and a cutoff wavelength of 898 nm. EDF sample 2 has a core diameter of 4.8 μm, a mode field diameter of 4.4 μm with respect to light of a wavelength of 980 nm, a mode field diameter of 5.9 μm with respect to light of a wavelength of 1550 nm, and a cutoff wavelength of 1347 nm. EDF sample 3 has a core diameter of 5.1 μm, a mode field diameter of 4.8 μm with respect to light of a wavelength of 980 nm, a mode field diameter of 6.3 μm with respect to light of a wavelength of 1550 nm, and a cutoff wavelength of 1358 nm. EDF sample 4 has a core diameter of 5.8 μm, a mode field diameter of 5.2 μm with respect to light of a wavelength of 980 nm, a mode field diameter of 6.8 μm with respect to light of a wavelength of 1550 nm, and a cutoff wavelength of 1419 nm. The pumping light wavelength employed is 980 nm.

The following measurement was also performed by the optical amplifier having the structure shown in FIG. 2. Namely, the power of the modulated signal light (having eight channels whose wavelengths range from 1530 nm to 1563 nm) outputted from the modulated signal light source 91 is set to −5 dBm, the power of the residual signal light (having one channel at a wavelength of 1550 nm) outputted from the residual signal light source 92 is set to −21 dBm, and the pumping light power is changed before and after a timing at which the input signal light power drops by 16 dB. The pumping light power is set such that the gain of the signal light remaining in the EDFA becomes constant at 21 dB. The gain of the residual signal light is 21 dB even in the state where the input signal light power is high as a matter of course.

Figure 12:
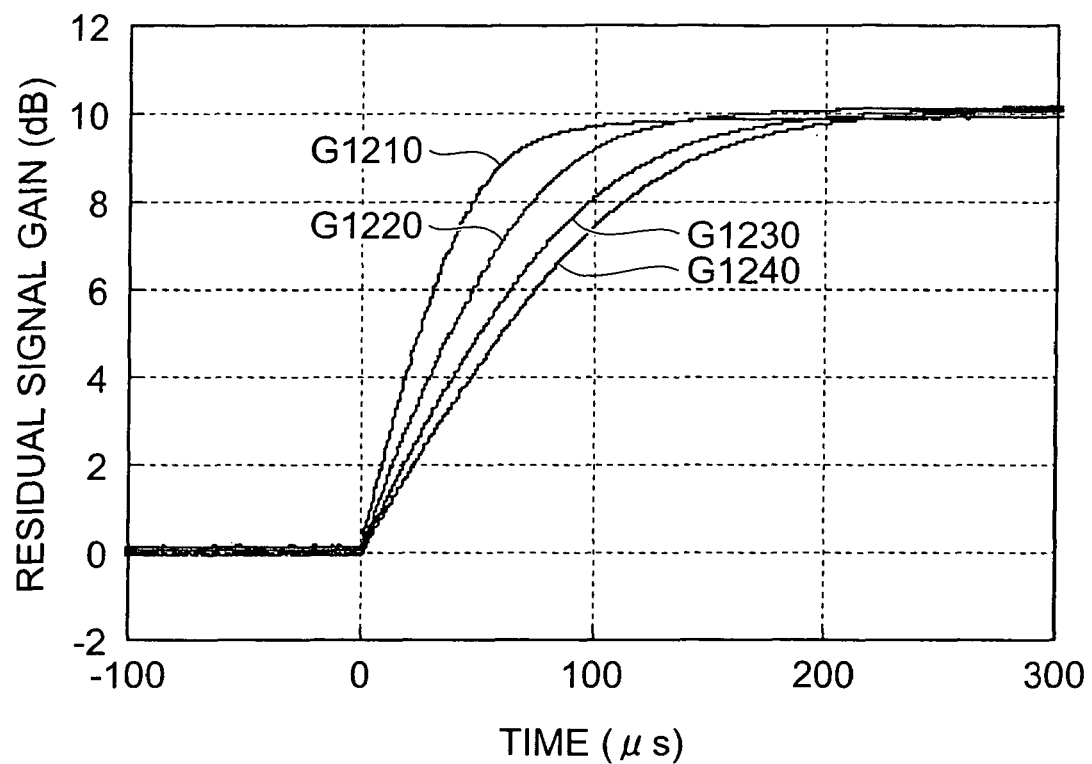
FIG. 12 is a graph showing temporal changes in gain when the pumping light power is unchanged with respect to increases and decreases in the input signal light power in a plurality of species of EDF samples having different core diameters.

FIG. 12 is a graph showing temporal changes in gain when the pumping light power is unchanged with respect to increases and decreases in the input signal light power in EDF samples 1 to 4 having different core diameters. The graph shown in FIG. 12 represents results of measurement of signal light gain when the input signal light power changes by about 16 dB, for example, from the high state (Pin2) to the low state (Pin1) while the pumping light power is fixed at Pump2. The point of time at which the input signal light power changes from the high state (Pin2) to the low state (Pin1) is also taken as a reference (time 0) in FIG. 12. In FIG. 12, the curve G1210 represents a temporal change of gain in EDF sample 1 (core diameter: 2.8 μm), the curve G1220 represents a temporal change of gain in EDF sample 2 (core diameter: 4.8 μm), the curve G1230 represents a temporal change of gain in EDF sample 3 (core diameter: 5.1 μm), and the curve G1240 represents a temporal change of gain in EDF sample 4 (core diameter: 5.8 μm).

As can be understood from FIG. 12, the rise factor of EDF sample 4 (core diameter: 5.8 μm) at time 0 is about half that of EDF sample 1 (core diameter: 2.8 μm). Thus, as the core diameter is larger, the overshoot rise response rate becomes lower (effective time constant $\tau_e$ becomes greater), thereby reducing the amount of overshoot per unit time.

Figure 13:
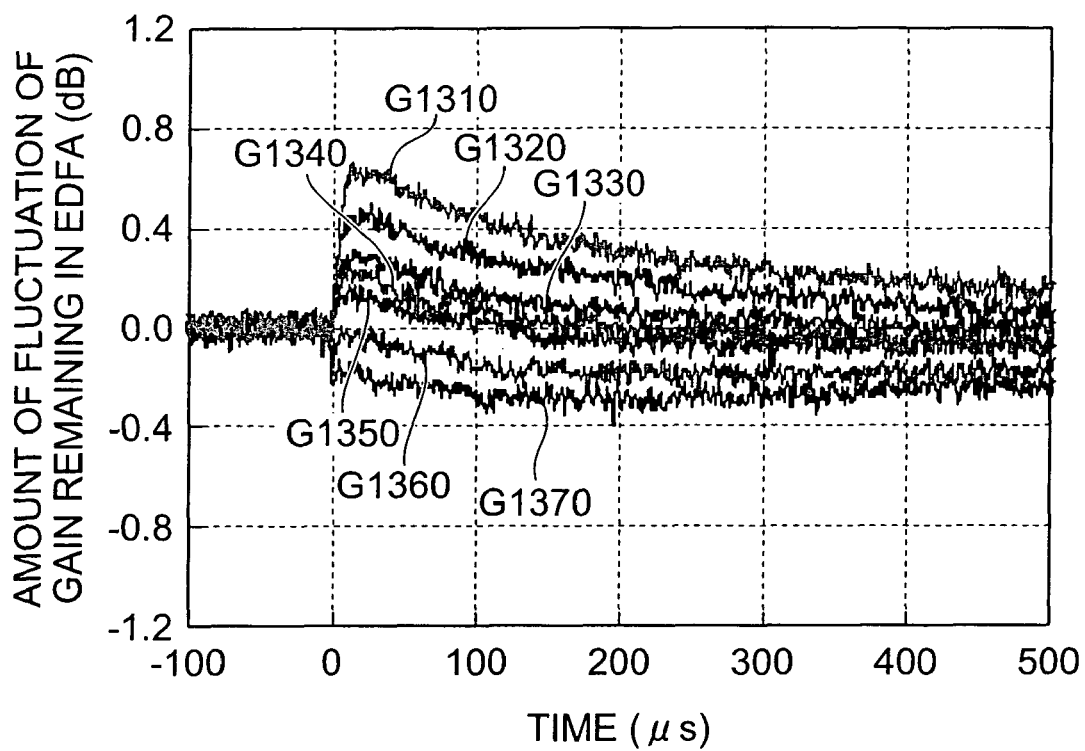
FIG. 13 is a graph showing temporal changes in gain when the pumping light power is changed before and after timings at which the input signal light power increases/decreases in an EDF having a large core diameter (5.8 µm)

FIG. 13 is a graph showing temporal changes in gain when the pumping light power is changed before and after timings at which the input signal light power increases/decreases in EDF sample 4 having a large core diameter (5.8 μm). In FIG. 13, the curve G1310 shows a gain fluctuation obtained when AGC is performed with delay of 5 μs from ON/OFF of the modulated signal light, the curve G1320 shows a gain fluctuation obtained when AGC is performed with delay of 3 μs from ON/OFF of the modulated signal light, the curve G1330 shows a gain fluctuation obtained when AGC is performed with delay of 1 μs from ON/OFF of the modulated signal light, the curve G1340 shows a gain fluctuation obtained when AGC is performed with delay of 0 μs from ON/OFF of the modulated signal light, the curve G1350 shows a gain fluctuation obtained when AGC is performed with delay of −1 μs from ON/OFF of the modulated signal light, the curve G1360 shows a gain fluctuation obtained when AGC is performed with delay of −3 μs from ON/OFF of the modulated signal light, and the curve G1370 shows a gain fluctuation obtained when AGC is performed with delay of −5 μs from ON/OFF of the modulated signal light.

The measurement in FIG. 13 was also performed by the optical amplifier having the structure shown in FIG. 2. Namely, the power of the modulated signal light (having eight channels whose wavelengths range from 1530 nm to 1563 nm) outputted from the modulated signal light source 91 is set to −5 dBm, the power of the residual signal light (having one channel at a wavelength of 1550 nm) outputted from the residual signal light source 92 is set to −21 dBm, and the pumping light power is changed before and after a timing at which the input signal light power drops by 16 dB. The pumping light power is set such that the gain of the signal light remaining in the EDFA becomes constant at 21 dB. The gain of the residual signal light is 21 dB even in the state where the input signal light power is high as a matter of course.

As can be understood from FIG. 13, the amount of gain fluctuation is suppressed to about 0.7 dB in EDF sample 4 even when the delay of power control for the pumping light is 5 μs. Therefore, EDFs having their core diameters expanded as compared with the EDF sample (core diameter: 2.8 µm) shown in FIG. 7 can suppress the gain fluctuation of about 1 dB.

Figure 14:
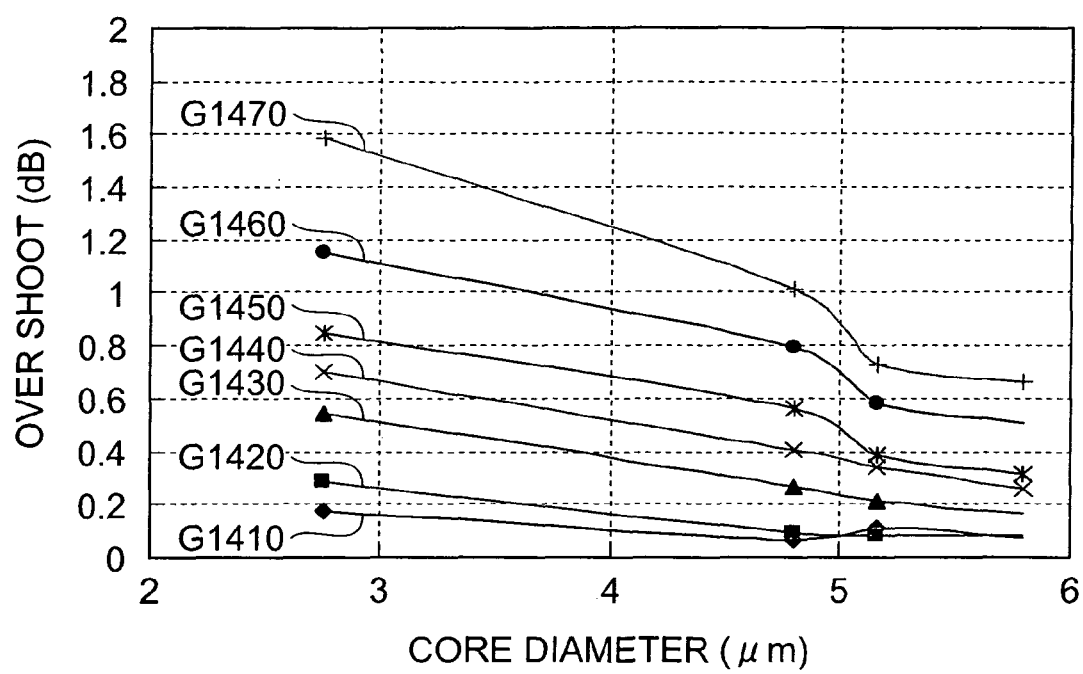
FIG. 14 is a graph showing relationships between core diameters and overshoot when the pumping light power is changed before and after timings at which the input signal light power increases and decreases.

FIG. 14 is a graph showing relationships between core diameters and overshoot when the pumping light power is changed before and after timings at which the input signal light power increases and decreases. In FIG. 14, the curve G1410 shows a relationship between overshoot amount and core diameter when AGC is performed with delay of 5 µs from ON/OFF of the modulated signal light, the curve G1420 shows a relationship between overshoot amount and core diameter when AGC is performed with delay of 3 µs from ON/OFF of the modulated signal light, the curve G1430 shows a relationship between overshoot amount and core diameter when AGC is performed with delays of 1 µs from ON/OFF of the modulated signal light, the curve G1440 shows a relationship between overshoot amount and core diameter when AGC is performed with delays of 0 µs from ON/OFF of the modulated signal light, the curve G1450 shows a relationship between overshoot amount and core diameter when AGC is performed with delays of −1 µs from ON/OFF of the modulated signal light, the curve G1460 shows a relationship between overshoot amount and core diameter when AGC is performed with delays of −3 µs from ON/OFF of the modulated signal light, and the curve G1470 shows a relationship between overshoot amount and core diameter when AGC is performed with delays of −5 µs from ON/OFF of the modulated signal light.

The measurement in FIG. 14 was also performed by the optical amplifier having the structure shown in FIG. 2. Namely, the power of the modulated signal light (having eight channels whose wavelengths range from 1530 nm to 1563 nm) outputted from the modulated signal light source 91 is set to −5 dBm, the power of the residual signal light (having one channel at a wavelength of 1550 nm) outputted from the residual signal light source 92 is set to −21 dBm, and the pumping light power is changed before and after a timing at which the input signal light power drops by 16 dB. The pumping light power is set such that the gain of the signal light remaining in the EDFA becomes constant at 21 dB. The gain of the residual signal light is 21 dB even in the state where the input signal light power is high as a matter of course.

As can be understood from FIG. 14, the overshoot amount decreases substantially linearly as the core diameter increases. This also makes it clear that EDFs having their core diameters expanded can suppress the overshoot at the time of transient responses more effectively than EDFs having smaller core diameters.

Figure 15:
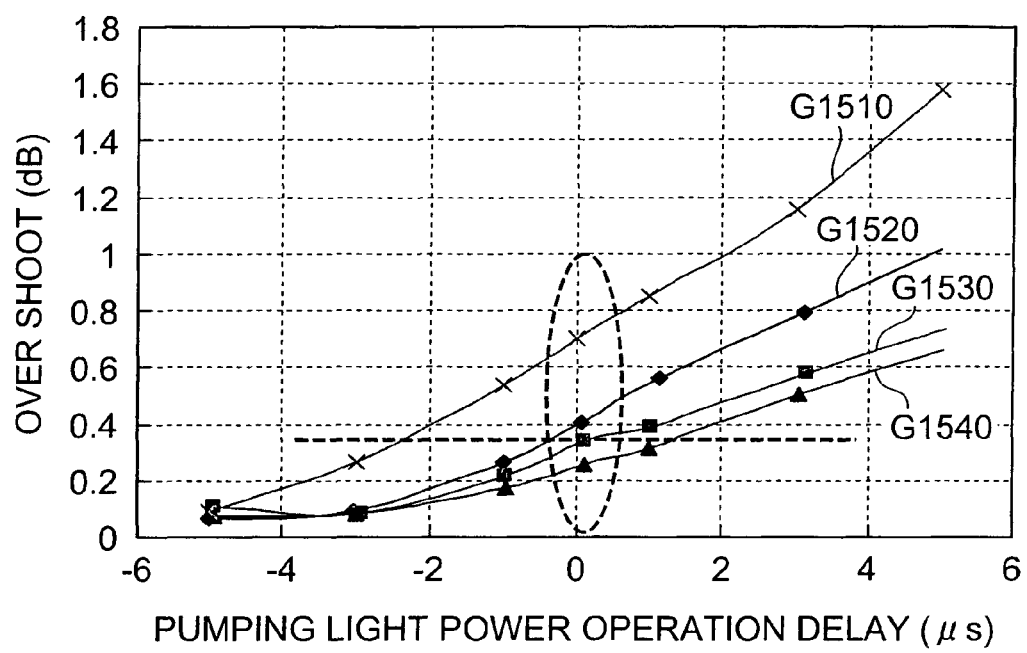
FIG. 15 is a graph showing relationships between the delay in pumping light power operations with reference to timings at which the input signal light power increases and decreases and the overshoot in a plurality of species of EDF samples having different core diameters.

FIG. 15 is a graph showing relationships between the delay in pumping light power operations with reference to timings at which the input signal light power increases and decreases and the overshoot in EDF samples 1 to 4 having different core diameters. In FIG. 15, the curve G1510 represents a relationship between overshoot amount and pumping light power control delay in EDF sample 1 (core diameter: 2.8 µm), the curve G1520 represents a relationship between overshoot amount and pumping light power control delay in EDF sample 2 (core diameter: 4.8 µm), the curve G1530 represents a relationship between overshoot amount and pumping light power control delay in EDF sample 3 (core diameter: 5.1 µm), and the curve G1540 represents a relationship between overshoot amount and pumping light power control delay in EDF sample 4 (core diameter: 5.8 µm).

The measurement in FIG. 15 was also performed by the optical amplifier having the structure shown in FIG. 2. Namely, the power of the modulated signal light (having eight channels whose wavelengths range from 1530 nm to 1563 nm) outputted from the modulated signal light source 91 is set to −5 dBm, the power of the residual signal light (having one channel at a wavelength of 1550 nm) outputted from the residual signal light source 92 is set to −21 dBm, and the pumping light power is changed before and after a timing at which the input signal light power drops by 16 dB. The pumping light power is set such that the gain of the signal light remaining in the EDFA becomes constant at 21 dB. The gain of the residual signal light is 21 dB even in the state where the input signal light power is high as a matter of course.

As can be understood from FIG. 15, when the pumping light power is controlled at a high speed substantially simultaneously with signal light modulation, the amount of overshoot in EDF sample 4 (core diameter: 5.8 µm) substantially equals the sum of the overshoot amount in EDF sample 1 (core diameter: 2.8 µm) and the overshoot amount in a delay fiber having a length of 600 m. This means that no delay fiber is necessary even when AGC is performed while using a high-speed control board, which is resultantly advantageous in reducing the size of the optical amplifier as a whole.

It has conventionally been common practice to set the cutoff wavelength of the amplification fiber shorter than the pumping wavelength. This is because, when the cutoff wavelength is set longer than the pumping wavelength, the pumping light is mode-transformed to a multimode within the amplification fiber, thereby lowering the pumping efficiency. When an amplification fiber having a cutoff wavelength longer than the pumping wavelength is free of internal causes of fiber disturbances such as mode transformations in fusion-spliced portions and microbending loss and external causes of disturbances such as bending of the fiber, however, no mode transformation to higher-order modes occurs within the amplification fiber, whereby the pumping light incident on the amplification fiber can propagate therethrough in a single mode. A method analyzing a near-field pattern at the amplification fiber output end is appropriate for investigating the propagation mode within the amplification fiber.

When the pumping light wavelength is 980 nm in the structure of the optical amplifier 1 shown in FIG. 2, for example, it is common practice for an optical fiber extending from the optical coupler 23 for multiplexing the pumping light and signal light to set its cutoff wavelength to 980 nm or shorter so as to propagate the pumping light at the wavelength of 980 nm in the fundamental mode. The optical fiber extending from the optical coupler 23 has an NA of 0.14 and a core 11a having an outer diameter of 5 µm. When light having a wavelength longer than the cutoff wavelength of an optical fiber acting as a transmission medium is incident on the optical fiber, not only the fundamental-mode light, but higher-order-mode light can also be propagated in general as mentioned above. However, light having a wavelength longer than the cutoff wavelength of an optical fiber acting as a transmission medium is not propagated in a higher-order mode at the instant when incident on the optical fiber, but can be propagated while keeping the mode prior to incidence on the optical fiber unless it is pumped to a higher-order mode.

When the light incident on an optical fiber is in the fundamental mode, the incident light thus propagates therethrough even in the case where the optical fiber has a cutoff wavelength longer than the incident light wavelength. Here, even when the fiber propagating the incident light is in a straight state or accommodated in a housing of an optical amplifier while being bent at a diameter of 60 mm or less, for example, the incident light propagates in a single mode unless pumping to a higher-order mode occurs. When fusion-splicing a guide fiber for guiding the incident light to the amplification fiber, it is necessary for them to be fusion-spliced together such that their centers accurately align with each other so that only the fundamental mode can propagate therethrough. While there is a technique for decreasing the cutoff wavelength by bending the amplification fiber (see the above-mentioned Patent Document 6), the incident light propagates in a single mode even without bending the amplification fiber until its cutoff wavelength becomes shorter than the wavelength of the incident light unless pumping to a higher-order mode occurs.

Figure 16:
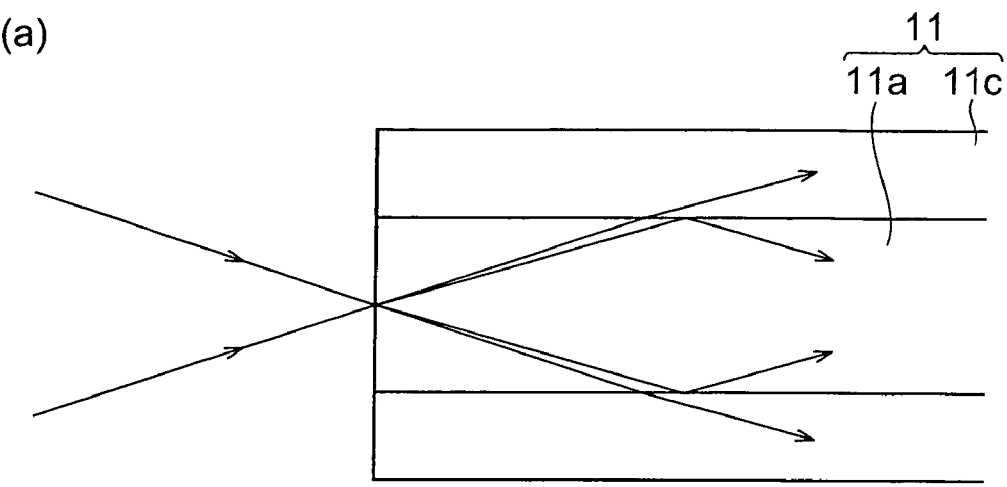
FIG. 16 is a view for explaining influences on propagation modes when connecting two kinds of optical fibers to each other.
Figure 16:
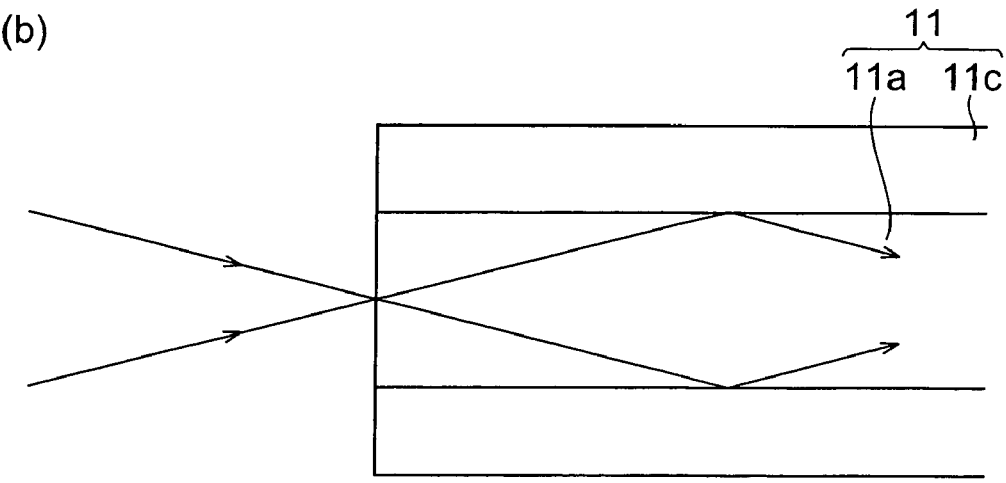

FIG. 16 is a view for explaining influences on propagation modes when connecting two kinds of optical fibers to each other. Each of the areas (a) and (b) shows how light is made incident on an end face of the optical fiber 11 from the outside thereof and how the light propagates through the optical fiber 11. In particular, the area (a) in FIG. 16 shows a case where the incident light has an NA greater than that of the optical fiber 11, so that the incident light has a radius greater than the core radius of the optical fiber 11. In the case of the area (a) shown in FIG. 16, the light enters the optical fiber 11 in excess, whereby pumping to higher-order modes and leakage to the cladding 11b occur. On the other hand, the area (b) in FIG. 16 shows a case where the incident light has an NA smaller than that of the optical fiber 11, so that the incident light has a radius smaller than the core radius of the optical fiber 11. In the case of the area (b) in FIG. 16, the light enters the optical fiber 11 in short, whereby only the mode by which the light originally propagates is pumped within the optical fiber 11.

In the optical amplifier 1 according to the first embodiment shown in FIG. 2, the pumping light having a wavelength of 980 nm outputted from the optical fiber of the optical coupler 23 corresponds to the incident light of FIG. 16, and is made incident on the rare-earth-element-doped optical fiber 11. The optical fiber of the optical coupler 23 has an NA of 0.14 and a core diameter of 5 µm. The rare-earth-element-doped optical fiber 11 has an NA of 0.14 and a core diameter of 5.1 µm. Therefore, the light enters the rare-earth-element-doped optical fiber 11 in short as shown in the area (b) of FIG. 16, so that the signal light also propagates through the rare-earth-element-doped optical fiber 11 by the propagation mode in the optical fiber of the optical coupler 23 (i.e., fundamental mode).

Though the short state shown in the area (b) of FIG. 16 means that the spot radius of incident light is smaller than the core radius of the optical fiber 11, light also propagates in the single mode through a conventionally employed EDF (having an NA of 0.14 and a core diameter of 2.5 µm), whereby a short incidence state is supposed to occur even when the spot radius of the incident light is somewhat greater than the core diameter of the optical fiber 11. Though the signal light may greatly be attenuated by leakage to the cladding 11b and the like in the excessive incidence state represented by the area (a) of FIG. 16, there is a technique of intentionally leaking the light to the cladding 11b by bending the optical fiber 11 (propagating third- or higher-order-mode light through the optical fiber 11), so as to amplify the higher-order-mode light, which necessitates an amplification fiber for amplifying the signal light propagating in a higher-order mode.

Figure 17:
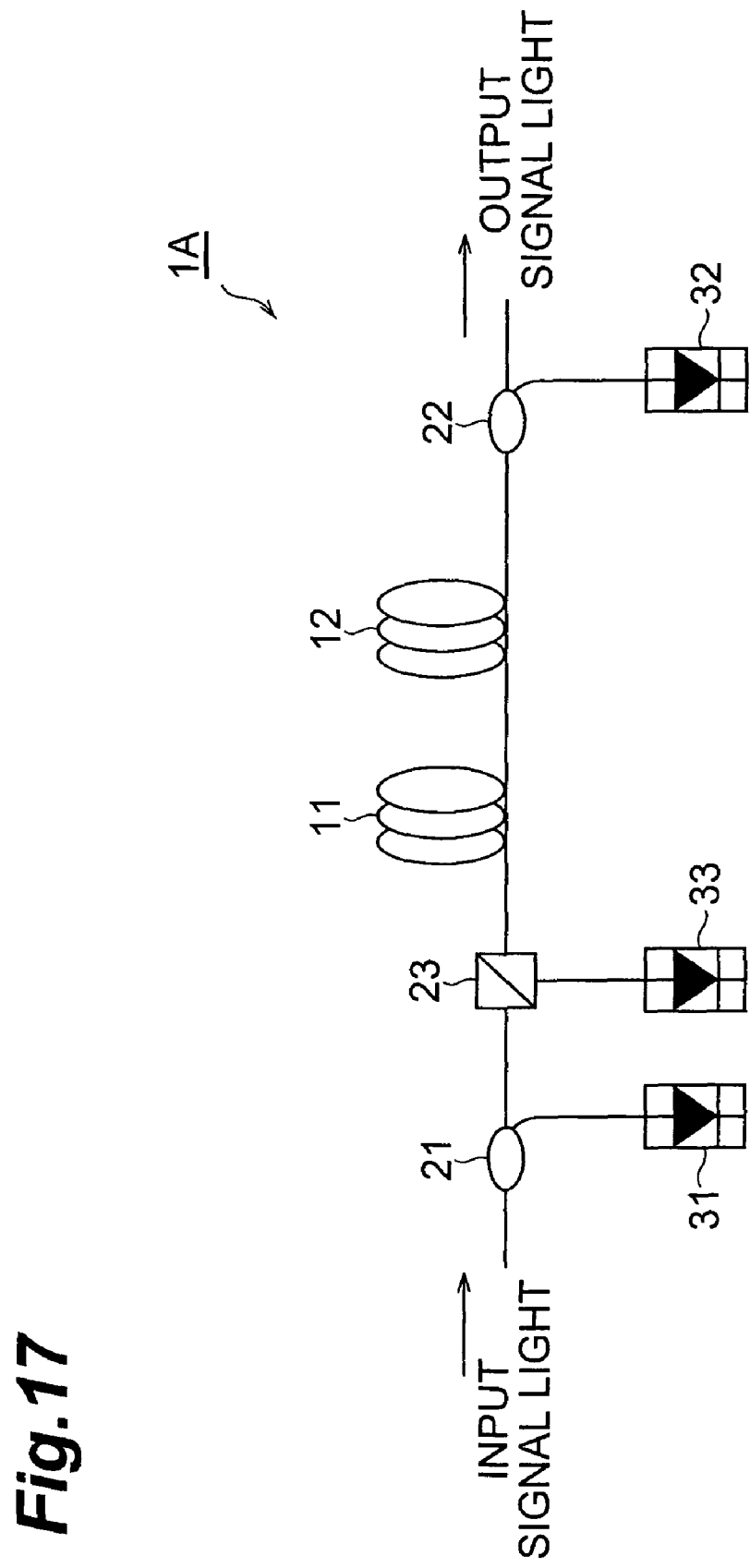
FIG. 17 is a view showing the structure of a second embodiment of the optical amplifier according to the present invention.
Figure 18:
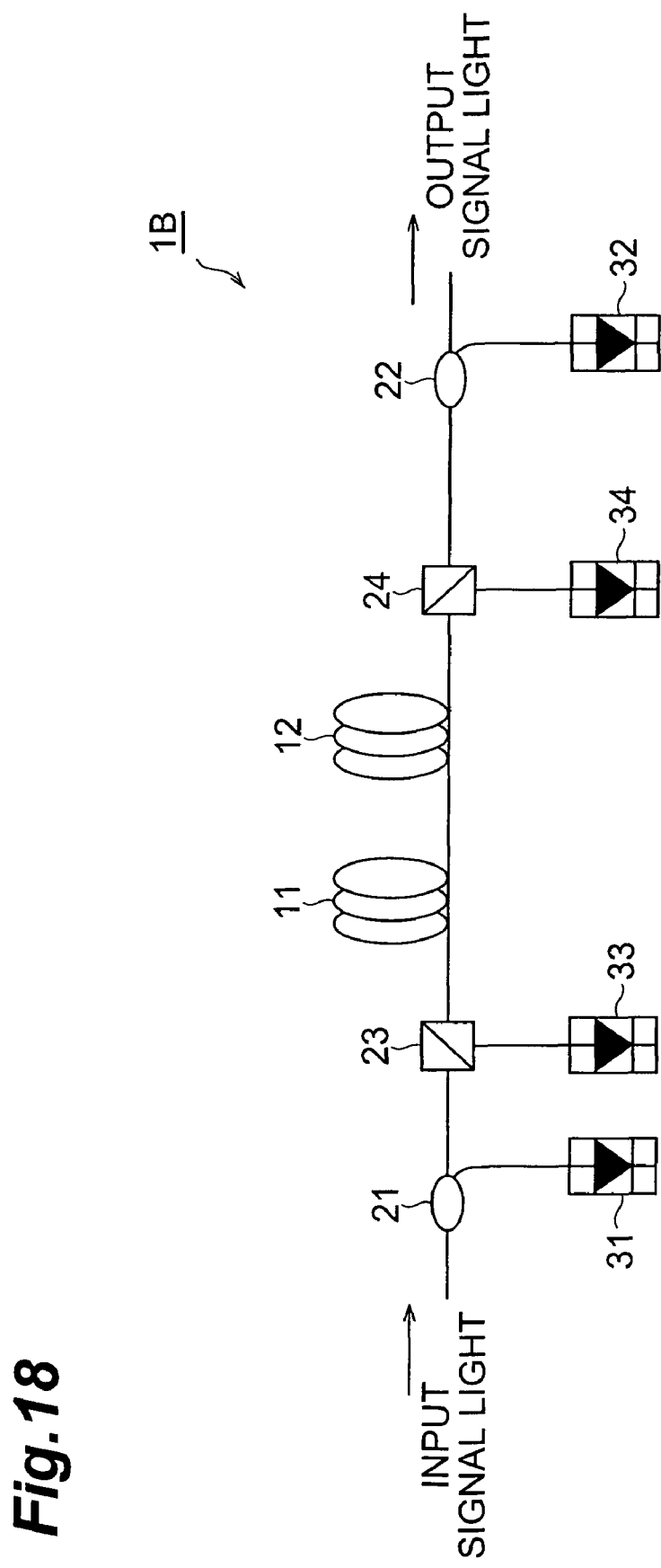
FIG. 18 is a view showing the structure of a third embodiment of the optical amplifier according to the present invention.
Figure 19:
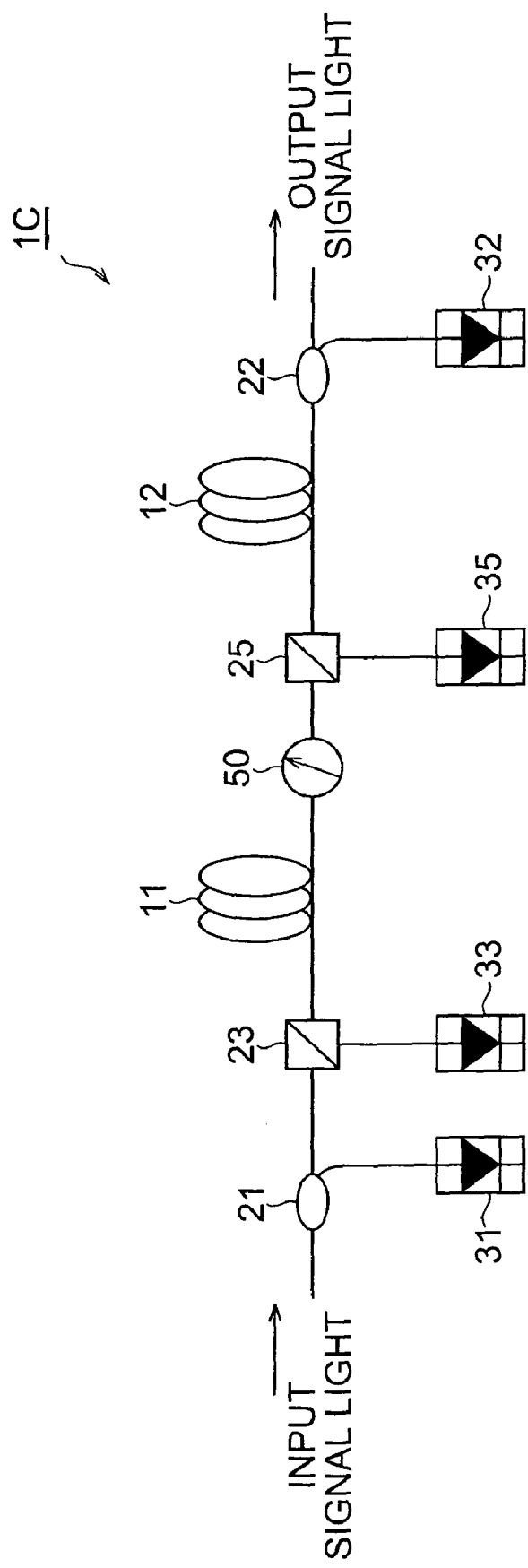
FIG. 19 is a view showing the structure of a fourth embodiment of the optical amplifier according to the present invention.

Though the foregoing explains the effect of suppressing the amount of transient response upon fluctuations in the number of channels in input signal light by using the rare-earth-element-doped optical fiber 11 having a cutoff wavelength longer than the pumping light wavelength, another rare-earth-element-doped optical fiber 12 may be provided downstream of the rare-earth-element-doped optical fiber 11. FIGS. 17 to 19 are respective diagrams of optical amplifiers according to such embodiments. As mentioned above, the upstream rare-earth-element-doped optical fiber 11 has a cutoff wavelength longer than the pumping light wavelength but shorter than the signal light wavelength. On the other hand, the downstream rare-earth-element-doped optical fiber 12 has a cutoff wavelength shorter than each of the pumping light wavelength and signal light wavelength.

FIG. 17 is a view showing the structure of a second embodiment of the optical amplifier according to the present invention. The optical amplifier 1A according to the second embodiment shown in FIG. 17 differs from the structure of the optical amplifier 1 in FIG. 2 in that the rare-earth-element-doped optical fiber 12 is provided downstream of the rare-earth-element-doped optical fiber 11. In the optical amplifier 1A according to the second embodiment, the pumping light outputted from the pumping light source 33 is supplied to the rare-earth-element-doped optical fiber 11 through the optical coupler 23, and then to the rare-earth-element-doped optical fiber 12. The signal light taken in through the input end 1a is inputted to the rare-earth-element-doped optical fiber 11 by way of the optical couplers 21 and 23. The signal light fed into the rare-earth-element-doped optical fiber 11 is amplified therein, and further in the rare-earth-element-doped optical fiber 12. Thus amplified signal light is thereafter passes through the optical coupler 22, so as to be outputted from the output end 1b. The optical amplifier 1A according to the second embodiment is constructed such that the transient response amount (overshoot amount) upon fluctuations in the number of channels of input signal light is suppressed within the upstream rare-earth-element-doped optical fiber 11. The downstream rare-earth-element-doped optical fiber 12 yields an effect similar to that of the conventional optical amplification. For example, adjusting the respective lengths of rare-earth-element-doped optical fibers 11, 12, their gain distribution, and the like in order to suppress the gain fluctuation in input signal light to a predetermined overshoot amount can effectively suppress the transient response amount at the output end in the optical amplifier 1A.

FIG. 18 is a view showing the structure of a third embodiment of the optical amplifier according to the present invention. The optical amplifier 1B according to the third embodiment shown in FIG. 18 differs from the structure of the optical amplifier 1A according to the second embodiment shown in FIG. 17 in that it further comprises an optical coupler 24 and a pumping light source 34. The optical coupler 24 is provided on a signal light path between the downstream rare-earth-element-doped optical fiber 12 and the optical coupler 22, supplies the rare-earth-element-doped optical fiber 12 with the pumping light outputted from the pumping light source 34, and outputs the signal light coming out of the downstream rare-earth-element-doped optical fiber 12 to the optical coupler 22. The pumping light outputted from the pumping light source 34 has a cutoff wavelength longer than each of the cutoff wavelengths of the rare-earth-element-doped optical fibers 11, 12. The pumping light outputted from the pumping light source 34 is fed to the rare-earth-element-doped optical fiber 12 through the optical coupler 24, and further to the rare-earth-element-doped optical fiber 11. When the output pumping light power of the pumping light source 33 for pumping the rare-earth-element-doped optical fiber 12 is in short in the optical amplifier 1B according to the third embodiment, the pumping light source 34 compensates for the shortage in pumping light power. The pumping light source 33 provides the effect of suppressing the overshoot amount upon fluctuations in the number of channels of input signal light. The same effect can also be obtained when the pumping light source 34 is arranged between the rare-earthelement-doped optical fibers 11 and 12 so that the rare-earth-element-doped optical fiber 12 is pumped by the pumping light source 34.

FIG. 19 is a view showing the structure of a fourth embodiment of the optical fiber according to the present invention. The optical amplifier 1C according to the fourth embodiment shown in FIG. 19 differs from the structure of the optical amplifier 1A according to the second embodiment shown in FIG. 17 in that it further comprises an optical coupler 25, a pumping light source 35, and a variable optical attenuator 50. The optical coupler 25 is provided between the rare-earth-element-doped optical fibers 11 and 12, supplies the rare-earth-element-doped optical fiber 12 with the pumping light outputted from the pumping light source 35, and outputs the signal light coming out of the upstream rare-earth-element-doped optical fiber 11 to the downstream rare-earth-element-doped optical fiber 12. The pumping light outputted from the pumping light source 35 has a wavelength longer than the cutoff wavelength of the rare-earth-element-doped optical fiber 12. The pumping light outputted from the pumping light source 35 passes through the optical coupler 25, so as to be supplied to the rare-earth-element-doped optical fiber 12. The variable optical attenuator 50 is provided between the rare-earth-element-doped optical fiber 11 and the optical coupler 25, inputs the light outputted from the rare-earth-element-doped optical fiber 11, and attenuates this light. The attenuated light is thereafter outputted to the optical coupler 25. The optical amplifier 1C according to the fourth embodiment also yields an effect similar to that of the optical amplifier 1B according to the above-mentioned third embodiment.

In each of the optical amplifiers 1B according to the third embodiment and the optical amplifier 1C according to the fourth embodiment, the rare-earth-element-doped optical fibers 11, 12 perform automatic gain control (AGC) not independently but collectively. A structure in which the rare-earth-element-doped optical fiber 11 having a cutoff wavelength longer than the pumping light wavelength and the rare-earth-element-doped optical fiber 12 having a cutoff wavelength shorter than the pumping light wavelength are connected together is one of means for yielding a high gain while suppressing the overshoot amount upon fluctuations in the number of channels of input signal light.

The present invention can be modified in various ways without being restricted to the above-mentioned embodiments. Though the above-mentioned embodiments relate to optical amplifiers employing fibers doped with erbium which is a rare-earth element, fibers doped or codoped with other rare-earth elements such as thulium (Tm), holmium (Ho), neodymium (Nb), samarium (Sm), and ytterbium (Yb), for example, yield an effect similar to that of the embodiments, since they have the principle of using pumping light so as to effect amplification by stimulated emission.

As described above, the present invention can suppress the over/undershoot in transient responses in high-speed AGC more than the prior art.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplifier for amplifying signal light inputted therein, said optical amplifier comprising:
a pumping light source for outputting pumping light;
a first rare-earth-element-doped optical fiber for amplifying the signal light propagating therethrough by supply of the pumping light outputted from said pumping light source;
an input signal light monitor section for monitoring a power of the signal light inputted into said first rare-earth-element-doped optical fiber;
an output signal light monitor section for monitoring a power of the signal light outputted from said first rare-earth-element-doped optical fiber; and
a control section for inputting therein respective monitoring results of said input and output signal light monitor sections, and regulating said pumping light source such that a gain determined in accordance with the monitoring results becomes a target gain by power control of the pumping light to be supplied to said first rare-earth-element-doped optical fiber,
wherein said first rare-earth-element-doped optical fiber has a cutoff wavelength longer than a pumping light wavelength but shorter than a signal light wavelength and mainly allows a pumping light component in a fundamental mode to propagate therethrough, and
wherein the pumping light and signal light are made incident on said first rare-earth-element-doped optical fiber, said first rare-earth-element doped optical fiber having an optical characteristic such that only the pumping light component in the fundamental mode and a signal light component in the fundamental mode propagate through said first rare-earth-element-doped optical fiber in a state where said first rare-earth-element-doped optical fiber extends straight.

2. An optical amplifier according to claim 1, wherein the time elapsing from an input signal light power fluctuation until said control section instructs said pumping light source to regulate the pumping light power is 1 millisecond or less.

3. An optical amplifier according to claim 1, further comprising a second rare-earth-element-doped optical fiber arranged at a position where the pumping light from said first rare-earth-element-doped optical fiber reaches, said second rare-earth-element-doped optical fiber having a cutoff wavelength shorter than the pumping light wavelength and amplifying the signal light having amplified by said first rare-earth-element-doped optical fiber.

4. An optical amplifier according to claim 1, wherein said optical amplifier includes an EDFA amplifying signal light included in a C band whose wavelength ranges from 1530 nm to 1565 nm by supply of pumping light in a 980-nm wavelength band.

5. An optical amplifier according to claim 1, wherein said optical amplifier includes an EDFA amplifying signal light included in an L band whose wavelength ranges from 1570 nm to 1610 nm by supply of pumping light in a 1480-nm wavelength band.

* * * * *